United States Patent
Yoon et al.

(10) Patent No.: US 12,075,375 B2
(45) Date of Patent: *Aug. 27, 2024

(54) METHOD AND APPARATUS FOR INDICATION OF SYNCHRONIZATION SIGNAL BLOCK

(71) Applicant: Innovative Technology Lab Co., Ltd., Seoul (KR)

(72) Inventors: Sung Jun Yoon, Seoul (KR); Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,779

(22) Filed: Apr. 29, 2023

(65) Prior Publication Data

US 2023/0269681 A1    Aug. 24, 2023

Related U.S. Application Data

(63) Continuation of application No. 17/836,293, filed on Jun. 9, 2022, now Pat. No. 11,678,283, which is a
(Continued)

(30) Foreign Application Priority Data

Jun. 16, 2017  (KR) .................. 10-2017-0076887
Jun. 15, 2018  (KR) .................. 10-2018-0068854

(51) Int. Cl.
*H04W 56/00*    (2009.01)
*H04L 1/1607*   (2023.01)
*H04W 72/30*    (2023.01)

(52) U.S. Cl.
CPC ......... *H04W 56/001* (2013.01); *H04L 1/1614* (2013.01); *H04W 72/30* (2023.01)

(58) Field of Classification Search
None
See application file for complete search history.

(56) References Cited

U.S. PATENT DOCUMENTS

| | | |
|---|---|---|
| 2014/0307653 A1 | 10/2014 | Liu et al. |
| 2014/0362701 A1 | 12/2014 | Roh et al. |
| (Continued) | | |

FOREIGN PATENT DOCUMENTS

| | | |
|---|---|---|
| CN | 106793058 | 5/2017 |
| WO | 2018204260 | 11/2018 |
| WO | 2018204849 | 11/2018 |

OTHER PUBLICATIONS

"3rd Generation Partnership Project; Technical Specification Group Radio Access Network; NR; Radio Resource Control (RRC); Protocol specification (Release 15)", 3GPP TS 38.331 V0.0.3, May 2017, 3GPP Organizational Partners.
(Continued)

*Primary Examiner* — Andre Tacdiran

(57) ABSTRACT

Disclosed is a method and apparatus for generating information indicating a synchronization signal (SS) block. A method comprises: determining a frequency resource associated with a wireless device; determining, by a base station and based on the determined frequency resource, whether to add or omit a first bitmap indicating a plurality of groups in which at least one synchronization signal (SS) block is transmitted; generating, based on the determining to add the first bitmap, system information comprising a parameter comprising: the first bitmap; and a second bitmap indicating a position of one or more transmission SS blocks in each of the plurality of groups; and transmitting, based on the position, the one or more transmission SS blocks each comprising a Physical Broadcast Channel (PBCH) and a synchronization signal.

30 Claims, 6 Drawing Sheets

Related U.S. Application Data continuation of application No. 17/373,170, filed on Jul. 12, 2021, now Pat. No. 11,711,776, which is a continuation of application No. 16/304,122, filed as application No. PCT/KR2018/006779 on Jun. 15, 2018, now Pat. No. 11,096,130.

(56) References Cited

U.S. PATENT DOCUMENTS

| | | | |
|---|---|---|---|
| 2017/0353257 | A1 | 12/2017 | Islam et al. |
| 2018/0227031 | A1* | 8/2018 | Guo .................. H04W 24/10 |
| 2018/0248642 | A1 | 8/2018 | Si et al. |
| 2018/0302843 | A1 | 10/2018 | Frenger et al. |
| 2018/0302889 | A1* | 10/2018 | Guo .................. H04B 7/0695 |
| 2018/0324022 | A1* | 11/2018 | Sheng ................ H04L 1/1614 |
| 2018/0324678 | A1 | 11/2018 | Chen et al. |
| 2018/0337755 | A1* | 11/2018 | John Wilson ....... H04J 11/0073 |
| 2019/0150110 | A1* | 5/2019 | Ko ..................... H04W 56/00 |
| | | | 370/350 |
| 2019/0215790 | A1 | 7/2019 | Kim et al. |
| 2020/0028606 | A1 | 1/2020 | Zhang |
| 2020/0067755 | A1* | 2/2020 | Pan .................... H04L 27/2656 |
| 2020/0084752 | A1 | 3/2020 | Astrom et al. |
| 2020/0092062 | A1* | 3/2020 | Yum ................... H04W 72/23 |
| 2020/0136739 | A1 | 4/2020 | Si et al. |
| 2020/0205159 | A1 | 6/2020 | Tang et al. |
| 2021/0099267 | A1 | 4/2021 | Yum et al. |

OTHER PUBLICATIONS

International Search Report for International Patent Application No. PCT/KR2018/006779, dated Sep. 27, 2018.
Apple Inc., "Signaling of SS Block Index", R1-1708277, 3GPP TSG RAN WG1 #89, May 7, 2017.
Motorola Mobility et al., "Indication of SS block timing information", R1-1708304, 3GPP TSG RAN WG1 #89, May 7, 2017.
Interdigital communications, "On synchronization signal block and indication", R1-1705498, 3GPP RAN WG1 Meeting #88bis, Mar. 25, 2017.
Motorola Mobility et al., "Discussion on SS block transmission", R1-1705549, 3GPP RAN WG1 Meeting #88bis, Mar. 25, 2017.
LG Electronics Inc., U.S. Appl. No. 62/502,543 corresponding to US 2019/0150110. (Year: 2017).
ZTE, ZTE Microelectronics: "Composition of SS block, burst and burst set", 3GPP TSG RAN WG1 Meeting #88bis R1-1704358 Spokane, USA Apr. 3-7, 2017.
European search report for EU Application No. 18817150.8 dated on Feb. 24, 2021.
MCC Support, "Final Report of 3GPP TSG RAN WG1 #90 v1.0.0 (Prague, Czech Rep, Aug. 21-25, 2017)", 3GPP TSG RAN WG1 Meeting #90bis R1-1716941, Prague, Czech Rep, Oct. 9-13, 2017, p. 1-172.

\* cited by examiner

METHOD AND APPARATUS FOR INDICATION OF SYNCHRONIZATION SIGNAL BLOCK

CROSS-REFERENCE TO RELATED APPLICATIONS

This application is a continuation of U.S. application Ser. No. 17/836,293, filed on Jun. 9, 2022, which is a continuation of U.S. application Ser. No. 17/373,170, filed on Jul. 12, 2021, which is a continuation of U.S. application Ser. No. 16/304,122, filed on Nov. 21, 2018, now issued as U.S. Pat. No. 11,096,130 on Aug. 17, 2021, which is the National Stage Entry of PCT International Application No. PCT/KR2018/006779, filed on Jun. 15, 2018, which claims priority from and the benefit of Korean Patent Application No. 10-2017-0076887, filed on Jun. 16, 2017, and Korean Patent Application No. 10-2018-0068854, filed on Jun. 15, 2018, each of which is hereby incorporated by reference in its entirety.

BACKGROUND

1. Field

The present disclosure relates to a radio communication system, and more particularly, to a method and system for generating information indicating a synchronization signal (SS) block for a new radio (NR) system and transmitting or receiving the information.

2. Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility, or the like. Also, there is a requirement for the NR system to support a wideband operation by providing a wider system bandwidth, which exceeds the maximum system bandwidth (e.g., up to 100 MHz) of legacy radio communication systems.

However, a method of configuring a synchronization (SS) block for the NR system has not been defined in detail.

SUMMARY

An aspect of the present disclosure provides a method and apparatus for indicating a time location of a synchronization signal (SS) block.

Another aspect of the present disclosure provides a method and apparatus for indicating a time location of an SS block at which a synchronization signal is actually transmitted.

Another aspect of the present disclosure provides a method and apparatus for indicating a time location of an SS block using a minimum signaling overhead.

Another aspect of the present disclosure provides a method and apparatus for indicating a time location of an SS block to a terminal at an initial stage.

An example method comprises: receiving, by a wireless device and from a base station, system information comprising a parameter, wherein the parameter comprises: a first bitmap indicating a plurality of groups in which at least one synchronization signal (SS) block is transmitted; and a second bitmap indicating a position of one or more transmission SS blocks in each of the plurality of groups; determining, based on the parameter, the one or more transmission SS blocks in each of the plurality of groups; and detecting, from each of the determined transmission SS blocks, a Physical Broadcast Channel (PBCH) and a synchronization signal.

An example method comprises: determining a frequency resource associated with a wireless device; generating, by a base station and based on the determined frequency resource, system information comprising a parameter, wherein the parameter comprises: a first bitmap indicating a plurality of groups in which at least one synchronization signal (SS) block is transmitted; and a second bitmap indicating a position of one or more transmission SS blocks in each of the plurality of groups; generating the one or more transmission SS blocks each comprising a Physical Broadcast Channel (PBCH) and a synchronization signal; and transmitting, based on the position, the generated one or more transmission SS blocks.

An example method comprises: determining a frequency resource associated with a wireless device; determining, by a base station and based on the determined frequency resource, whether to add or omit a first bitmap indicating a plurality of groups in which at least one synchronization signal (SS) block is transmitted: generating, based on the determining to add the first bitmap, system information comprising a parameter comprising: the first bitmap; and a second bitmap indicating a position of one or more transmission SS blocks in each of the plurality of groups; and transmitting, based on the position, the one or more transmission SS blocks each comprising a Physical Broadcast Channel (PBCH) and a synchronization signal.

DETAILED DESCRIPTION OF THE ILLUSTRATED EMBODIMENTS

Figure 1:
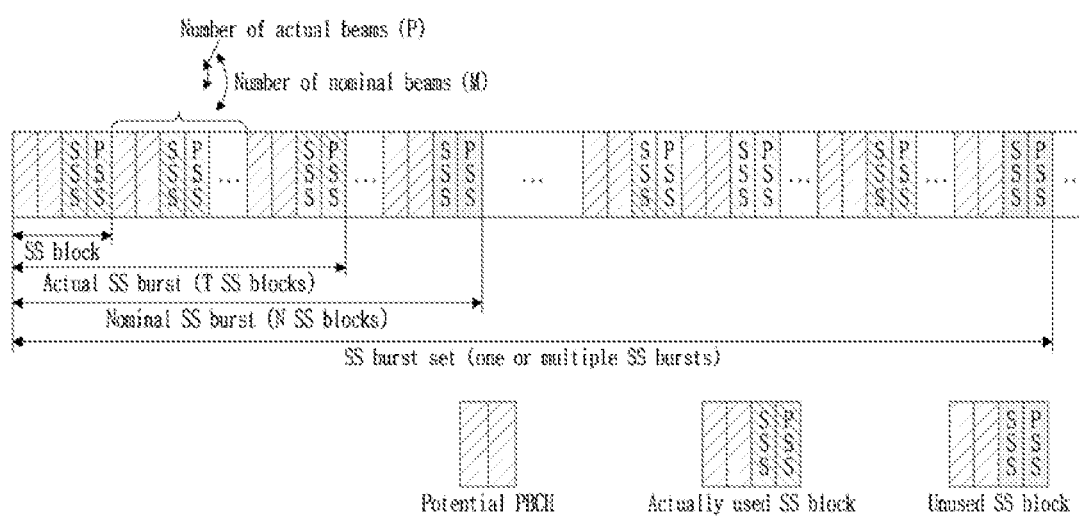
FIG. 1 illustrates an example of a synchronization signal (SS) transmission.

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

Initially, a numerology used in the NR system is described.

An NR numerology may indicate a numerical value of a basic element or factor that generates a resource grid on a time-frequency domain for design of the NR system. As an example of a numerology of a 3rd Generation Partnership Project (3GPP) Long Term Evolution (LTE)/LTE-Advanced (LTE-A) system, a subcarrier spacing corresponds to 15 kilohertz (kHz) (or 7.5 kHz in the case of Multicast-Broadcast Single-Frequency Network (MBSFN)) and a normal Cyclic Prefix (CP) or an extended CP. Here, the meaning of the term 'numerology' does not restrictively indicate only the subcarrier spacing and includes a Cyclic Prefix (CP) length, a Transmit Time Interval (TTI) length, a number of Orthogonal Frequency Division Multiplexing (OFDM) symbols within a desired time interval, a duration of a single OFDM symbol, etc., associated with the subcarrier spacing (or determined based on the subcarrier spacing). That is, one numerology may be distinguished from another numerology based on at least one of the subcarrier spacing, the CP length, the TTI length, the number of OFDM symbols within the desired time interval, and the duration of the single OFDM symbol.

To meet the requirements of the program "International Mobile Telecommunication (IMT) for 2020 and beyond", the 3GPP NR system is currently considering a plurality of numerologies based on various scenarios, various service requirements, compatibility with a potential new system, and the like. In more detail, since current numerologies of wireless communication systems may not readily support, for example, a further higher frequency band, faster movement rate, and lower latency required in the program "IMT for 2020 and beyond", there is a need to define a new numerology.

For example, the NR system may support applications, such as enhanced Mobile Broadband (eMBB), massive Machine Type Communications/Ultra Machine Type Communications (mMTC/uMTC), and Ultra-Reliable and Low Latency Communications (URLLC). In particular, the requirements for user plane latency on the URLLC or eMBB service correspond to 0.5 ms in an upper link and 4 ms in all of the upper link and a down link. A significant latency decrease is required compared to the latency of 10 ms required in the 3GPP LTE and LTE-A system.

Various numerologies need to be supported to meet such various scenarios and various requirements in a single NR system. In particular, a plurality of subcarrier spacings (SCSs) needs to be supported, which differs from the existing LTE/LTE-A systems that supports a single SCS.

To resolve an issue that a wide bandwidth is unavailable in an existing carrier or frequency range of, e.g., 700 megahertz (MHz) or 2 gigahertz (GHz), a new numerology for the NR system, which includes supporting the plurality of SCSs, may be determined with the assumption of a wireless communication system that operates in a carrier or a frequency range of 6 GHz or more or 40 GHz or more. However, the scope of the present disclosure is not limited thereto.

To newly define the NR system, there is a need to define a synchronization scheme having a meaning as an initial stage in which a mobile communication terminal connects to a network. However, a scheme of configuring a synchronization signal for supporting synchronization, a scheme of mapping and thereby transmitting the synchronization signal on time-frequency resources, a scheme of receiving a synchronization signal mapped on time-domain resources, and the like are not defined in detail so far.

In the NR system, at least two types of synchronization signals may be defined. For example, the two types of synchronization signals may include an NR-primary synchronization signal (NR-PSS) and an NR-secondary synchronization signal (NR-SSS).

The NR-PSS may be used to perform synchronization on an initial symbol boundary with respect to an NR cell.

The NR-SSS may be used to detect an NR cell ID or a portion of the NR cell ID.

A bandwidth for transmission of a PSS/SSS and/or Physical Broadcast Channel (PBCH) in a previous radio communication system (e.g., LTE/LTE-A system) of the NR system is defined as 1.08 megahertz (MHz) corresponding to six physical resource blocks (PRBs). The NR system may use a relatively wide transmission bandwidth to transmit an NR-PSS/SSS and/or NR-PBCH compared to the previous radio communication system. For this purpose, the NR system may use a subcarrier spacing (SCS) greater than 15 kilohertz (kHz).

If operating in 6 GHz or less, one of 15 kHz and 30 kHz may be considered as a default SCS. Here, one of 5 MHz, 10 MHz, and 20 MHz may be considered as a minimum NR carrier bandwidth. Also, one of 1.08 MHz, 2.16 MHz, 4.32 MHz, and 8.64 MHz or one of bandwidths close thereto may be used as a transmission bandwidth of each synchronization signal.

If operating in 6 GHz or more (e.g., between 6 GHz and 52.5 GHz), one of 120 kHz and 240 kHz may be considered as a default SCS. Here, one of 120 MHz and 240 MHz may be considered as a minimum NR carrier bandwidth. Also, one of 8.64 MHz, 17.28 MHz, 34.56 MHz, and 69.12 MHz or one of bandwidths close thereto may be considered as a transmission bandwidth of each synchronization signal.

FIG. 1 illustrates an example of a synchronization signal (SS) transmission according to the present disclosure.

An NR-PSS, an NR-SSS, and/or an NR-PBCH may be transmitted within a synchronization block (SS) block. Here, the SS block indicates a time-domain resource area that includes all of the NR-PSS, the NR-SSS and/or the NR-PBCH.

At least one SS block may constitute an SS burst. A single SS burst may be defined to include a predetermined number of SS blocks, which may also be referred to as a duration of the SS burst. Also, at least one SS block may be continuous or discontinuous within a single SS burst. Also, at least one SS block within a single burst may be identical or different.

At least one SS burst may constitute an SS burst set. A single SS burst set may be defined to include a predetermined periodicity and a predetermined number of SS bursts. A number of SS bursts within the SS burst set may be defined to be definite. Also, a transmission point in time of the SS burst set may be periodically defined and may also be a periodically defined.

At least one subcarrier spacing (SCS) may be predefined for each synchronization signal (e.g., NR-PSS, NR-SSS, NR-PBCH) with respect to a specific frequency range or carrier. For example, at least one of 3.75, 7.5, 15, 30, 60, 120, 240, and 480 kHz may be applied as the SCS.

Here, the SCS for the NR-PSS, the NR-SSS, or the NR-PBCH may be identical or different. Also, at least one frequency range may be given and different frequency ranges may overlap. Also, with respect to a specific frequency range, a single numerology may be defined and a plurality of numerologies may be defined. Accordingly, one or more SCSs may be defined with respect to the specific frequency range.

Also, in perspective of a terminal, the SS burst set may be periodically transmitted.

Figure 2A:
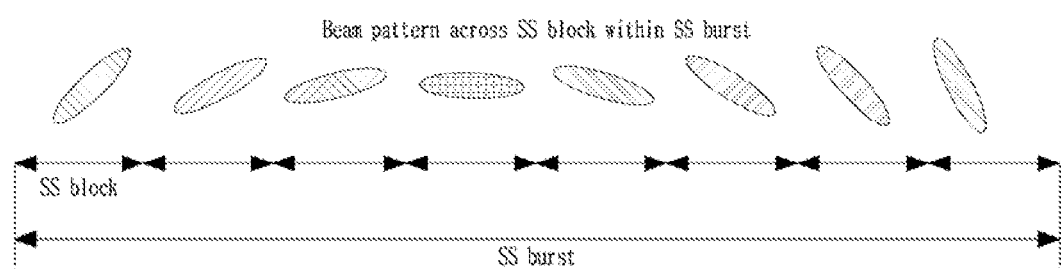
FIGS. 2A and 2B illustrate an example of a transmission through a plurality of beams in an SS transmission.
Figure 2B:
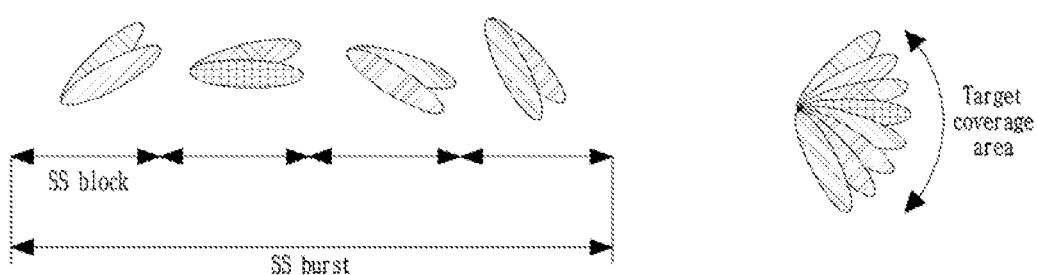

FIGS. 2A and 2B illustrate an example of a transmission through a plurality of beams in an SS transmission according to the present disclosure.

To overcome a poor channel environment, such as high pathloss, phase-noise, and frequency offset, occurring on a high carrier frequency, an NR system may consider transmission of a synchronization signal, a random access signal, and a broadcast channel through a plurality of beams.

The transmission through the plurality of beams may be variously determined based on a cell environment, for example, a number of beams used for the transmission and a width of each beam. Accordingly, a standardization regarding a maximum number of beams and a maximum amount of physical resources required for the transmission is required to provide a degree of freedom for implementation as above.

Hereinafter, a method of transmitting a beam in an SS burst including a single SS block or a plurality of SS blocks is described with reference to FIG. 2A and FIG. 2B.

Referring to FIG. 2A, a single beam is applied per single SS block and an analog beamforming method is generally applied. In this case, a number of applicable beams is limited based on a number of radio frequency (RF) chains.

Referring to FIG. 2B, two beams are applied per single SS block and a digital beamforming method or a hybrid beamforming method is generally applied. Using this method, beam sweeping for covering a target coverage area may be performed further quickly. Therefore, a relatively small number of SS blocks may be used compared to FIG. 2A, which may lead to enhancing network resource consumption efficiency.

Figure 3:
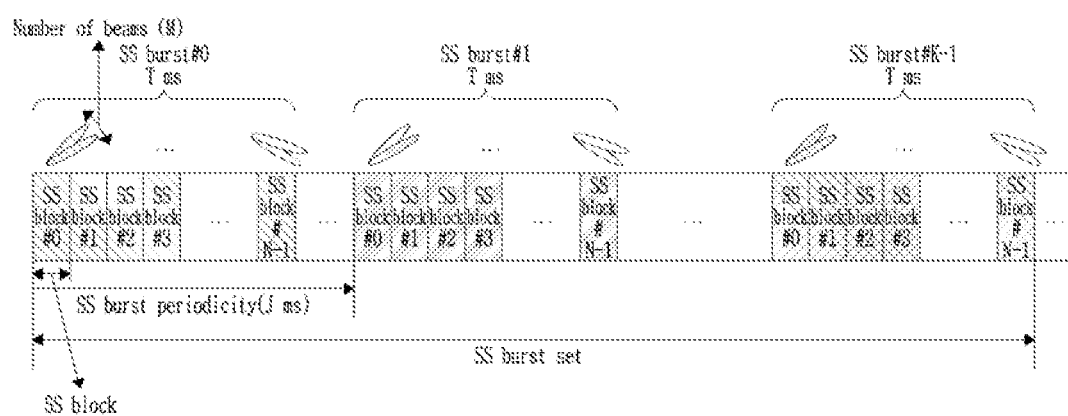
FIG. 3 illustrates an example of a structure of an SS frame in the case of considering a transmission through a plurality of beams in an SS transmission.

FIG. 3 illustrates an example of a structure of an SS frame in the case of considering a transmission through a plurality of beams in an SS transmission according to the present disclosure.

Referring to FIG. 3, transmission of at least one beam may be applied to the same SS block in an NR system, which differs from LTE. When a plurality of beams is transmitted to a single SS block, an SS block transmission to which different beam patterns are applied through beam sweeping may be performed to satisfy a target coverage area. Here, the target coverage area indicates that transmission of at least one beam and transmission of each beam are performed to cover the target coverage area based on a beam width/azimuth intended by a base station.

Referring to FIG. 3, a synchronization signal may be transmitted by applying a single beam or a plurality of beams for each single SS block. Within a single SS block, at least one of an NR-PSS, an NR-SSS, and an NR-PBCH may be transmitted. With respect to a given frequency band, a single SS block corresponds to N OFDM symbols defined based on a default SCS. Here, N denotes a constant. For example, if N=4, four OFDM symbols may be used within a single SS block. Here, a single OFDM symbol may be used for the NR-PSS, another OFDM symbol may be used for the NR-SSS, and the remaining two OFDM symbols may be used for the NR-PBCH.

Referring to FIG. 3, a single SS block or a plurality of SS blocks may be configured as a single SS burst. SS blocks that constitute a single SS burst may be consecutively allocated or inconsecutively allocated in a time domain or a frequency domain.

Also, a single SS burst or a plurality of SS bursts may be configured as a single SS burst set. From a perspective of a terminal, transmission of the SS burst set is periodic and the terminal assumes a default transmission period value during an initial cell selection per specific carrier frequency. The terminal may receive updated information on the SS burst set transmission period from the base station.

The terminal may induce a symbol/slot index and a radio frame index from a time index of a single SS block. The symbol/slot index and the radio frame index according to the time index of each SS block may be defined to be fixed. Accordingly, if the time index of each SS block is known, a frame/symbol timing of each SS block may be known based on a relationship between the SS block time index and the symbol/slot index and the radio frame index that are defined to be fixed for each SS block. Through this, the entire frame/symbol timings may be known.

Here, in the case of the SS block time index, 1) an SS burst index may be defined within the SS burst set and a time index for a single SS block may be defined for each SS block within a single SS burst, and 2) a time index for a single SS block may be defined for each SS block within the SS burst set.

Hereinafter, the NR-PBCH is described.

The NR-PBCH may include system information (SI) in a form of an NR-master information block (NR-MIB). NR-MIB contents included in the NR-PBCH may include system frame number (SFN), timing information within the radio frame, remaining minimum system information (RMSI) scheduling information, and the like.

The timing information within the radio frame may include an SS block time index and a half radio frame timing.

The RMSI scheduling information may correspond to setting information associated with an NR-Physical Downlink Control Channel (NR-PDCCH) for scheduling NR-Physical Downlink Shared Channel (NR-PDSCH) including RMSI.

Also, the NR-PBCH may be designed to have a size of 40 bits or more to 72 bits or less, including a cyclic redundancy check (CRC).

Figure 4:
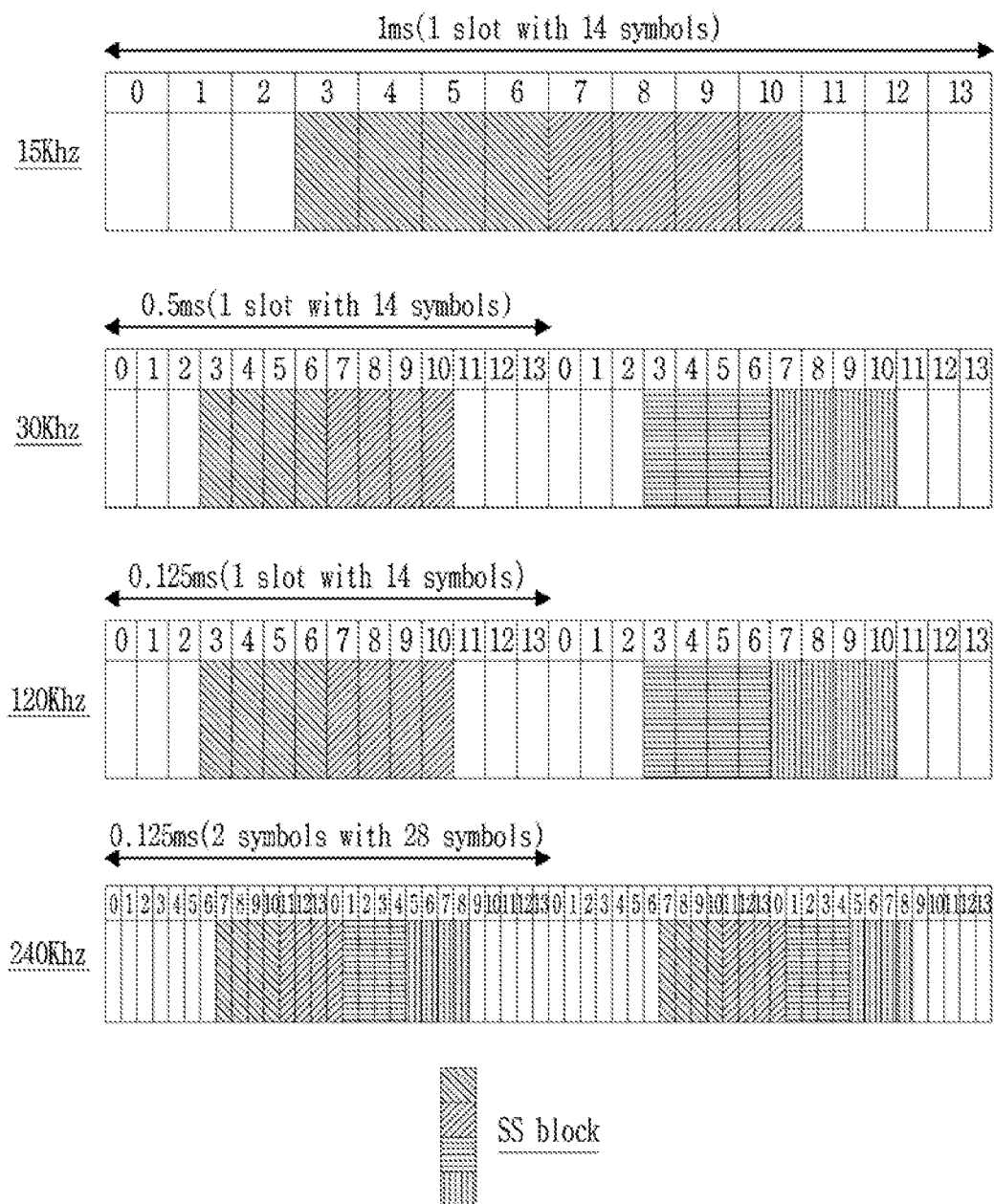
FIG. 4 illustrates examples of a structure of a time location of an SS block.

FIG. 4 illustrates examples of a structure of a time location of an SS block according to the present disclosure.

FIG. 4 illustrates examples of a time location of an SS block when an SCS is 15 kHz, 30 kHz, 120 kHz, or 240 kHz.

A nominal SS block within an SS burst set corresponds to an available candidate time location of the SS block. A number of nominal SS blocks and time locations thereof within the SS burst set may be predefined.

The NR-PBCH (e.g., NR-MIB or NR-PBCH DM-RS) and RMSI may be used to indicate an SS block that is actually transmitted among nominal SS blocks. Also, a signaling scheme considering flexibility and signaling overhead is required to select and indicate an actual transmission SS block.

Herein, in terms of an SS block configuration, it is assumed that the NR-PSS, the NR-SSS, and the NR-PBCH are present for every SS block and the NR-PSS initially maps compared to the NR-SSS in a temporal aspect, and the NR-PBCH maps two symbols within a single SS block.

Transmission of SS blocks within the SS burst set may be confined within a window of a size of 5 ms regardless of SS burst set periodicity. For example, the SS burst set periodicity may be 5, 10, 20, 40, 80, or 160 ms and default SS burst set periodicity may be defined as 20 ms. A number of available candidate SS block locations (i.e., nominal SS block locations within the SS burst set) within such 5-ms window is L. That is, L denotes a maximum number of SS blocks within the SS burst set.

Here, L may have a different value based on a frequency range. For example, L=4 in the frequency range of 3 GHz or less, L=8 in the frequency range of 3 GHz to 6 GHz, and L=64 in the frequency range of 6 GHz to 52.6 GHz.

Also, a minimum number of transmitted SS blocks within each SS burst set may be assumed to be greater than or equal to 1.

The following mapping rule may be applied to an available SS block time location.

Although it is assumed in the following description that a single includes 14 symbols, a time domain size actually used by a single slot may vary based on an SCS as illustrated in FIG. 4.

If SCS=15 kHz and 30 kHz, a minimum of a single symbol or two symbols may be used for transmission of downlink control information at a start portion of a single slot including 14 symbols. Thus, an SS block may not map at a corresponding symbol location. Also, a minimum of two symbols are used for a guard interval and transmission of uplink control information at a last portion of a single slot including 14 symbols. Thus, an SS block may not map at a corresponding symbol location. Accordingly, time locations of a maximum of two SS blocks may be defined within a single slot including 14 symbols.

If SCS=120 kHz, a minimum of two symbols may be used for transmission of downlink control information at a start portion of a single slot including 14 symbols. Thus, an SS block may not map at a corresponding symbol location. Also, a minimum of two symbols may be used for a guard interval and transmission of uplink control information at a last portion of a single slot including 14 symbols. Thus, an SS block may not map at a corresponding symbol location. Accordingly, time locations of a maximum of two SS blocks may be defined within a single slot including 14 symbols.

If SCS=240 kHz, SS block mapping may be defined across two consecutive slots (here, each slot including 14 symbols). A minimum of four symbols may be used for transmission of downlink control information at a start portion of a first slot including 14 symbols. Thus, an SS block may not map at a corresponding symbol location. Also, a minimum of four symbols may be used for a guard interval and transmission of uplink control information at a last portion of a second slot including 14 symbols. Accordingly, time locations of a maximum of four SS blocks may be defined within two consecutive slots (i.e., 28 consecutive symbols).

As described above, a number of SS blocks (i.e., actual transmission SS blocks) used for actual SS transmission among nominal SS blocks within the SS burst set may vary depending on whether it is a single-beam operation or a beam-sweeping operation. For example, when SS blocks operate using beam-sweeping, terminals within coverage of one or more beams may not detect all of the transmitted SS blocks. Therefore, if a maximum number of SS blocks is assumed, it may cause wasting of spectrum resources.

Accordingly, if information indicating actual transmission SS blocks is provided to a terminal at an early stage, it may give some help at a timing at which the terminal performs measurement and receives downlink data or control information in all of an RRC_CONNECTED mode and an RRC_IDLE mode. For example, information indicating the actual transmission SS blocks may be included in the NR-MIB provided to the terminal through the NR-PBCH or may be included in the RMSI provided to the terminal through the NR-PDSCH.

In detail, if the terminal is unaware of an actual transmission SS block among nominal SS blocks, the terminal may attempt an SS detection by applying a blind detection scheme to all of the nominal SS blocks, which may lead to increasing power consumption. If the terminal is aware of the actual transmission SS block among the nominal SS blocks, the terminal may attempt the SS detection only for the actual transmission SS block, which may lead to saving the power consumption.

For example, the terminal that performs an initial cell section does not have information on the actual transmission SS block and thus, may detect a synchronization signal from among the nominal SS blocks through blind detection and may acquire system information based on the detected synchronization signal. If the terminal may acquire information indicating the actual transmission SS block through system information, the terminal may perform SS detection in the actual transmission SS block at a subsequent point in time.

Hereinafter, a method of providing, by the base station to the terminal, information indicating the actual transmission SS block according to the present disclosure is described.

Initially, information indicating the actual transmission SS block may be signaled through the MIB or the RMSI. Here, according to the ongoing discussion, the MIB includes 48 to 72 bits and the RMSI includes about 200 bits. A bitmap with a size of 64 bits is required to indicate whether each of 64 nominal SS blocks within a single SS burst set is an actual transmission SS block using the bitmap. However, the bitmap with such size may have great overhead to be signaled through the MIB or the RMSI and thus, may not be present with other signaling information. Accordingly, disclosed herein is a method of efficiently signaling actual transmission SS block indication information by minimizing the size of information indicating the actual transmission SS block.

Embodiment 1

The present embodiment relates to a method of indicating an index of an actual transmission SS block using a bitmap. For example, the base station may provide the terminal with information indicating an actual transmission SS block among a set of a predetermined number (=L_base) of nominal SS blocks. For example, the set of the predetermined number of nominal SS blocks may be a set of nominal SS blocks included in a single SS burst set. Bitmap information indicating the actual transmission SS block may be defined and thereby used by using, as a unit, the set of the predetermined number of nominal SS blocks.

The bitmap information may relate to a bitmap that uses the set of the predetermined number of nominal SS blocks within the SS burst set as a unit, and may further include additional information that is described below. Through this, a time index of an SS block corresponding to a time location of the actual transmission SS block among the entire nominal SS blocks may be indicated.

Also, the bitmap information may be provided through RMSI or an NR-MIB included in an NR-PBCH.

Embodiment 1-1

The present embodiment relates to a method of using L_base bits of "bitmap for actual transmission SS block index" included in the RMSI or the NR-MIB transmitted through the NR-PBCH.

If the frequency range is less than or equal to 3 GHz, a maximum of four SS blocks (i.e., block index #0 to SS block index #3) may be present within a single SS burst set and 4 bits of "bitmap for actual transmission SS block index" may be defined based thereon. That is, the bitmap information may indicate an SS block that is actually used among the four SS blocks.

For example, if a bit value corresponding to an SS block among bit locations of a bitmap is 0, it indicates that the SS block is not an actual transmission SS block and if the bit value is 1, it may indicate that the SS block is the actual transmission SS block. Alternatively, if the bit value corresponding to the SS block among bit locations of the bitmap is 0, it may indicate that the SS block is the actual transmission SS block and if the bit value is 1, it may indicate that the SS block is not the actual transmission SS block.

Hereinafter, the "bitmap for actual transmission SS block index" with the L_base bit size is referred to as a "basic bitmap". Here, a value of L_base may be defined as L_base=4 based on a case in which the frequency range is less than or equal to 3 GHz. However, it is provided as an example only. Although a value of L_base is less than 4 or greater than 4, the basic bitmap with the L_base bit size may be defined and used.

If the frequency range is 3 GHz to 6 GHz, a maximum of eight SS blocks (i.e., SS block index #0 to SS block index #7) may be present within a single SS burst set. The eight SS blocks include two groups each including four SS blocks. That is, two groups may be defined as an SS block group #0 (SS block indices #0 to #3) and SS block group #1 (SS block indices #4 to #7). Here, the basic bitmap may be applied to each of the two SS block groups each including four SS blocks. That is, the same basic bitmap is repeated twice. Here, information on only a single basic bitmap is provided to the terminal. Accordingly, a location of the actual transmission SS block is identical in each of the two SS block groups each including four SS blocks.

Hereinafter, a set of a number of consecutive nominal SS blocks corresponding to a size of the basic bitmap is referred to as a "basic SS block group". That is, a set of L_base consecutive nominal SS blocks may be referred to as the basic SS block group. Here, a value of L_base may be defined as L_base=4 based on a case in which the frequency range is less than or equal to 3 GHz. However, it is provided as an example only. Although a value of L_base is less than 4 or greater than 4, a set of L_base consecutive nominal SS blocks may be defined and thereby used as the base SS block group.

If the frequency range is 6 GHz to 52.6 GHz, a maximum of 64 SS blocks (i.e., SS block index #0 to SS block index #63) may be present within a single SS burst set. The 64 SS blocks include 16 (or 64/L_base) basic SS block groups. Here, the basic bitmap may be applied to each of the 16 basic SS block group. That is, the same basic bitmap is repeated 16 times. Here, information on only a single bitmap is provided to the terminal. Accordingly, a location of the actual transmission SS block is identical in each of the 16 basic SS block groups.

Embodiment 1-2

The present embodiment relates to a method of using additional information to indicate a time index of an actual transmission SS block with respect to a set of nominal SS blocks greater than the size of the basic bitmap defined in the aforementioned embodiment 1-1. Here, the additional information may be information indicating an application pattern of the basic bitmap with respect to a specific basic SS block group.

For example, if the frequency range is less than or equal to 3 GHz, the terminal may be informed a time index of an SS block corresponding to a time location of an actual transmission SS block using a basic bitmap with an L_base bit size included in RMSI or an NR-MIB transmitted through an NR-PBCH.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and basic bitmap application pattern indication information of an additional 1-bit size.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and basic bitmap application pattern indication information of an additional 2-bit or 3-bit size.

In the aforementioned embodiment 1-1, the unity may be achieved by signaling bitmap information of the L_base bit size regardless of the frequency range, however, flexibility may be degraded. To complement this, the actual transmission SS block may be set and indicated by using basic bitmap application pattern indication information of an additional 1 bit if the frequency range is 3 GHz to 6 GHz and using basic bitmap application pattern indication information of additional 2 bits or 3 bits if the frequency range is 6 GHz to 52.6 GHz. Here, the basic bitmap with the L_base bit size may be defined to be identical to that of embodiment 1-1.

Additional bit information according to the present embodiment may be defined to indicate a pattern in which the basic bitmap is applied to basic SS block groups. A basic bitmap application pattern may be defined in a form of a table as shown in the following examples.

In the following examples, whether the basic bitmap is applied is indicated with 0 or X in the basic bitmap application pattern. 0 indicates that an SS block corresponding to a location at which a bit value of the basic bitmap is 0 (or 1) is the actual transmission SS block. X indicates that all of the SS blocks included in the basic SS block group are not actual transmission SS blocks.

If the frequency range is less than or equal to 3 GHz, a 4-bit basic bitmap may be applied with respect to a maximum of four SS blocks (i.e., SS block index #0 to SS block index #3). Thus, additional bit information indicating the basic bitmap application pattern may not be defined.

If the frequency range is 3 GHz to 6 GHz, the basic bitmap application pattern for 2 (=8/L_base) basic SS block groups may be defined as additional 1-bit information as shown in the following Table 1 with respect to a maximum of eight SS blocks (i.e., SS block index #0 to SS block index #7).

TABLE 1

| Bit value | #0 to #3 | #4 to #7 |
|---|---|---|
| 0 | ○ | ○ |
| 1 | ○ | X |

In Table 1, #0 to #3 denote SS blocks (SS block indices #0 to #3) in SS block group #0 and #4 to #7 denote SS blocks (SS block indices #4 to #7) in SS block group #1.

In Table 1, if a value of 1-bit information is 0, it may indicate that the same basic bitmap is applied to each of two basic SS block groups.

If the value of 1-bit information is 1, it may indicate that the basic bitmap is applied to one (e.g., a first SS block group) of the two basic SS block groups and the basic bitmap is not applied to the other (e.g., a second SS block group) thereof. That is, the basic bitmap is applied to one (e.g., the first SS block group) of the two basic SS block groups without using offset (i.e., offset value=0).

If the frequency range is 6 GHz to 52.6 GHz, the basic bitmap application pattern for 16 (=64/L_base) basic SS block groups may be defined as additional 3-bit information as shown in the following Table 2 with respect to a maximum of 64 SS blocks (i.e., SS block index #0 to SS block index #63).

TABLE 2

| Bit value | #0 to #3 | #4 to #7 | #8 to #11 | #12 to #15 | #16 to #19 | #20 to #23 | #24 to #27 | #28 to #31 | #32 to #35 | #36 to #39 | #40 to #43 | #44 to #47 | #48 to #51 | #52 to #55 | #56 to #59 | #60 to #63 |
|---|---|---|---|---|---|---|---|---|---|---|---|---|---|---|---|---|
| 000 | ○ | ○ | ○ | ○ | ○ | ○ | ○ | ○ | ○ | ○ | ○ | ○ | ○ | ○ | ○ | ○ |
| 001 | ○ | X | ○ | X | ○ | X | ○ | X | ○ | X | ○ | X | ○ | X | ○ | X |
| 010 | ○ | X | X | X | ○ | X | X | X | ○ | X | X | X | ○ | X | X | X |
| 011 | ○ | X | X | X | X | X | X | X | ○ | X | X | X | X | X | X | X |
| 100 | ○ | X | X | X | X | X | X | X | X | X | X | X | X | X | X | X |

In Table 2, if a value of 3-bit information is 0, it may indicate that the same basic bitmap is applied to each of 16 basic SS block groups.

If the value of 3-bit information is 1, it may indicate that the basic bitmap is applied to eight basic SS block groups among the 16 basic SS block groups. That is, the basic bitmap is applied to every two SS block groups without using offset (i.e., offset value=0) with respect to the 16 basic SS block groups.

If the value of 3-bit information is 2, it may indicate that the basic bitmap is applied to four basic SS block groups among the 16 basic SS block groups. For example, SS block groups to which the basic bitmap is to be applied may be selected to be separate at maximally equivalent distances. That is, the basic bitmap is applied to every four SS block groups without using offset (i.e., offset value=0) with respect to the 16 basic SS block groups.

If the value of 3-bit information is 3, it may indicate that the basic bitmap is applied to two basic SS block groups among the 16 basic SS block groups. For example, SS block groups to which the basic bitmap is to be applied may be selected to be separate at maximally equivalent distances. That is, the basic bitmap is applied to every eight SS block groups without using offset (i.e., offset value=0) with respect to the 16 basic SS block groups.

If the value of 3-bit information is 4, it may indicate that the basic bitmap is applied to a single basic SS block group among the 16 basic SS block groups. That is, the basic bitmap is applied to one (e.g., the first SS block group) of the 16 basic SS block groups without using offset (i.e., offset value=0).

As an additional example, the basic bitmap application pattern for 16 (=64/L_base) basic SS block groups may be defined as additional 2-bit information as shown in the following Table 3 with respect to a maximum of 64 SS block groups (i.e., SS block index #0 to SS block index #63).

TABLE 3

| Bit value | #0 to #3 | #4 to #7 | #8 to #11 | #12 to #15 | #16 to #19 | #20 to #23 | #24 to #27 | #28 to #31 | #32 to #35 | #36 to #39 | #40 to #43 | #44 to #47 | #48 to #51 | #52 to #55 | #56 to #59 | #60 to #63 |
|---|---|---|---|---|---|---|---|---|---|---|---|---|---|---|---|---|
| 00 | O | O | O | O | O | O | O | O | O | O | O | O | O | O | O | O |
| 01 | O | X | O | X | O | X | O | X | O | X | O | X | O | X | O | X |
| 10 | O | X | X | X | O | X | X | X | O | X | X | X | O | X | X | X |
| 11 | O | X | X | X | X | X | X | X | O | X | X | X | X | X | X | X |

In Table 3, if a value of 2-bit information is 0, it may indicate that the same basic bitmap is applied to each of the 16 basic SS block groups.

If the value of 2-bit information is 1, it may indicate that the basic bitmap is applied to eight basic SS block groups among the 16 basic SS block groups. That is, the basic bitmap is applied to every two SS block groups without using offset (i.e., offset value=0) with respect to the 16 basic SS block groups.

If the value of 2-bit information is 2, it may indicate that the basic bitmap is applied to four basic SS block groups among the 16 basic SS block groups. For example, SS block groups to which the basic bitmap is to be applied may be selected to be separate at maximally equivalent distances. That is, the bitmap is applied to every four SS block groups without using offset (i.e., offset value=0) with respect to the 16 basic SS block groups.

If the value of 2-bit information is 3, it may indicate that the basic bitmap is applied to two basic SS block groups among the 16 basic SS block groups. For example, the SS block groups to which the basic bitmap is to be applied may be selected to be separate at maximally equivalent distances. That is, the bitmap is applied to every eight SS block groups without using offset (i.e., offset value=0) with respect to the 16 basic SS block groups.

Embodiment 1-3

The present embodiment relates to a method of using additional information to indicate a time index of an actual transmission SS block with respect to a set of nominal SS blocks greater than the size of the basic bitmap defined in the aforementioned embodiment 1-1. Here, the additional information may be information indicating a combination of an offset value and an application pattern of the basic bitmap with respect to a specific basic SS block group.

For example, if the frequency range is less than or equal to 3 GHz, the terminal may be informed a time index of an SS block corresponding to a time location of an actual transmission SS block using the basic bitmap with an L_base bit size included in RMSI or an NR-MIB transmitted through an NR-PBCH.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and basic bitmap application pattern indication information of an additional 2-bit size.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and basic bitmap application pattern indication information of an additional 4-bit or 5-bit size.

Compared to the aforementioned embodiment 1-2, the present embodiment may provide high flexibility in terms of selecting the actual transmission SS block. However, overhead may be great in terms of a number of bits to be signaled.

If the frequency range is less than or equal to 3 GHz, a 4-bit basic bitmap may be applied with respect to a maximum of four SS blocks (i.e., SS block index #0 to SS block index #3). Thus, additional bit information indicating the basic bitmap application pattern may not be defined.

If the frequency range is 3 GHz to 6 GHz, the basic bitmap application pattern for 2 (=8/L_base) basic SS block groups may be defined as additional 2-bit information as shown in the following Table 4 with respect to a maximum of eight SS blocks (i.e., SS block index #0 to SS block index #7).

TABLE 4

| Bit value | #0 to #3 | #4 to #7 |
|---|---|---|
| 00 | O | O |
| 01 | O | X |
| 10 | X | O |

In Table 4, if a value of 1-bit information is 0 (=00), it may indicate that the same basic bitmap is applied to each of two basic SS block groups.

If the value of 1-bit information is 1 (=10) or 2 (=11), it may indicate that the basic bitmap is applied to one of the two basic SS block groups and the basic bitmap is not applied to the other thereof. That is, the basic bitmap is applied to one of the two basic SS block groups depending on whether offset value=0 or 1. In detail, if the value of 1-bit information is 1 (=10), it may indicate that the offset value is 0, and if the value of 1-bit information is 2 (=11), it may indicate that the offset value is 1. That is, if the value of 1-bit information is 1 (=10), the offset value is 0 and thus, the basic bitmap is applied to the first basic SS block group and the basic bitmap is not applied to the second basic SS block group. If the value of 1-bit information is 2 (=11), the offset value is 1 and thus, the basic bitmap is not applied to the first basic SS block group and the basic bitmap is applied to the second basic SS block group.

If the frequency range is 6 GHz to 52.6 GHz, the basic bitmap application pattern for 16 (=64/L_base) basic SS block groups may be defined as additional 5-bit information as shown in the following Table 5 with respect to a maximum of 64 SS blocks (i.e., SS block index #0 to SS block index #63).

If the value of 5-bit information is 7, 8, 9, 10, 11, 12, 13, or 14, it may indicate that the basic bitmap is applied to two basic SS block groups among the 16 basic SS block groups.

TABLE 5

| Bit value | #0 to #3 | #4 to #7 | #8 to #11 | #12 to #15 | #16 to #19 | #20 to #23 | #24 to #27 | #28 to #31 | #32 to #35 | #36 to #39 | #40 to #43 | #44 to #47 | #48 to #51 | #52 to #55 | #56 to #59 | #60 to #63 |
|---|---|---|---|---|---|---|---|---|---|---|---|---|---|---|---|---|
| 00000 | O | O | O | O | O | O | O | O | O | O | O | O | O | O | O | O |
| 00001 | O | X | O | X | O | X | O | X | O | X | O | X | O | X | O | X |
| 00010 | X | O | X | O | X | O | X | O | X | O | X | O | X | O | X | O |
| 00011 | O | X | X | X | O | X | X | X | O | X | X | X | O | X | X | X |
| 00100 | X | O | X | X | X | O | X | X | X | O | X | X | X | O | X | X |
| 00101 | X | X | O | X | X | X | O | X | X | X | O | X | X | X | O | X |
| 00110 | X | X | X | O | X | X | X | O | X | X | X | O | X | X | X | O |
| 00111 | O | X | X | X | X | X | X | X | O | X | X | X | X | X | X | X |
| 01000 | X | O | X | X | X | X | X | X | X | O | X | X | X | X | X | X |
| 01001 | X | X | O | X | X | X | X | X | X | X | O | X | X | X | X | X |
| 01010 | X | X | X | O | X | X | X | X | X | X | X | O | X | X | X | X |
| 01011 | X | X | X | X | O | X | X | X | X | X | X | X | O | X | X | X |
| 01100 | X | X | X | X | X | O | X | X | X | X | X | X | X | O | X | X |
| 01101 | X | X | X | X | X | X | O | X | X | X | X | X | X | X | O | X |
| 01110 | X | X | X | X | X | X | X | O | X | X | X | X | X | X | X | O |
| 01111 | O | X | X | X | X | X | X | X | X | X | X | X | X | X | X | X |
| 10000 | X | O | X | X | X | X | X | X | X | X | X | X | X | X | X | X |
| 10001 | X | X | O | X | X | X | X | X | X | X | X | X | X | X | X | X |
| 10010 | X | X | X | O | X | X | X | X | X | X | X | X | X | X | X | X |
| 10011 | X | X | X | X | O | X | X | X | X | X | X | X | X | X | X | X |
| 10100 | X | X | X | X | X | O | X | X | X | X | X | X | X | X | X | X |
| 10101 | X | X | X | X | X | X | O | X | X | X | X | X | X | X | X | X |
| 10110 | X | X | X | X | X | X | X | O | X | X | X | X | X | X | X | X |
| 10111 | X | X | X | X | X | X | X | X | O | X | X | X | X | X | X | X |
| 11000 | X | X | X | X | X | X | X | X | X | O | X | X | X | X | X | X |
| 11001 | X | X | X | X | X | X | X | X | X | X | O | X | X | X | X | X |
| 11010 | X | X | X | X | X | X | X | X | X | X | X | O | X | X | X | X |
| 11011 | X | X | X | X | X | X | X | X | X | X | X | X | O | X | X | X |
| 11100 | X | X | X | X | X | X | X | X | X | X | X | X | X | O | X | X |
| 11101 | X | X | X | X | X | X | X | X | X | X | X | X | X | X | O | X |
| 11110 | X | X | X | X | X | X | X | X | X | X | X | X | X | X | X | O |

In Table 5, if a value of 5-bit information is 0, it may indicate that the same basic bitmap is applied to each of 16 basic SS block groups.

If the value of 5-bit information is 1 or 2, it may indicate that the basic bitmap is applied to eight basic SS block groups among the 16 basic SS block groups. That is, an offset value of 0 or 1 is applied to the 16 basic SS block groups and the basic bitmap is applied to every two SS block groups.

If the value of 5-bit information is 3, 4, 5, or 6, it may indicate that the basic bitmap is applied to four basic SS block groups among the 16 basic SS block groups. For example, SS block groups to which the basic bitmap is to be applied may be selected to be separate at maximally equivalent distances. That is, an offset value of 0, 1, 2, or 3 is applied to the 16 basic SS block groups and the basic bitmap is applied to every four SS block groups.

For example, SS block groups to which the basic bitmap is to be applied may be selected to be separate at maximally equivalent distances. That is, an offset value of 0, 1, 2, 3, 4, 5, 6, or 7 is applied to the 16 basic SS block groups and the basic bitmap is applied to every eight SS block groups.

If the value of 5-bit information is 15, 16, 17, 18, 19, 20, 21, 22, 23, 24, 25, 26, 27, 28, 29, or 30, it may indicate that the basic bitmap is applied to a single basic SS block group among the 16 basic SS block groups. That is, an offset value of 0, 1, 2, 3, 4, 5, 6, 7, 8, 9, 10, 11, 12, 13, 14, or 15 is applied to one of the 16 basic block groups and the basic bitmap is applied.

As an additional example, the basic bitmap application pattern for 16 (=64/L_base) basic SS block groups may be defined as additional 4-bit information as shown in the following Table 6 with respect to a maximum of 64 SS block groups (i.e., SS block index #0 to SS block index #63).

TABLE 6

| Bit value | #0 to #3 | #4 to #7 | #8 to #11 | #12 to #15 | #16 to #19 | #20 to #23 | #24 to #27 | #28 to #31 | #32 to #35 | #36 to #39 | #40 to #43 | #44 to #47 | #48 to #51 | #52 to #55 | #56 to #59 | #60 to #63 |
|---|---|---|---|---|---|---|---|---|---|---|---|---|---|---|---|---|
| 0000 | O | O | O | O | O | O | O | O | O | O | O | O | O | O | O | O |
| 0001 | O | X | O | X | O | X | O | X | O | X | O | X | O | X | O | X |
| 0010 | X | O | X | O | X | O | X | O | X | O | X | O | X | O | X | O |
| 0011 | O | X | X | X | O | X | X | X | O | X | X | X | O | X | X | X |
| 0100 | X | O | X | X | X | O | X | X | X | O | X | X | X | O | X | X |
| 0101 | X | X | O | X | X | X | O | X | X | X | O | X | X | X | O | X |
| 0110 | X | X | X | O | X | X | X | O | X | X | X | O | X | X | X | O |
| 0111 | O | X | X | X | X | X | X | X | O | X | X | X | X | X | X | X |
| 1000 | X | O | X | X | X | X | X | X | X | O | X | X | X | X | X | X |
| 1001 | X | X | O | X | X | X | X | X | X | X | O | X | X | X | X | X |
| 1010 | X | X | X | O | X | X | X | X | X | X | X | O | X | X | X | X |

TABLE 6-continued

| Bit value | #0 to #3 | #4 to #7 | #8 to #11 | #12 to #15 | #16 to #19 | #20 to #23 | #24 to #27 | #28 to #31 | #32 to #35 | #36 to #39 | #40 to #43 | #44 to #47 | #48 to #51 | #52 to #55 | #56 to #59 | #60 to #63 |
|---|---|---|---|---|---|---|---|---|---|---|---|---|---|---|---|---|
| 1011 | X | X | X | X | O | X | X | X | X | X | X | X | O | X | X | X |
| 1100 | X | X | X | X | X | O | X | X | X | X | X | X | X | O | X | X |
| 1101 | X | X | X | X | X | X | O | X | X | X | X | X | X | X | O | X |
| 1110 | X | X | X | X | X | X | X | O | X | X | X | X | X | X | X | O |

In table 6, if a value of 4-bit information is 0, it may indicate that the same basic bitmap is applied to each of the 16 basic SS block groups.

If the value of 4-bit information is 1 or 2, it may indicate that the basic bitmap is applied to eight basic SS blocks among the 16 basic SS block groups. That is, an offset value of 0 or 1 is applied to the 16 basic SS block groups and the basic bitmap is applied to every two SS block groups.

If the value of 5-bit information is 3, 4, 5, or 6, it may indicate that the basic bitmap is applied to four basic SS block groups among the 16 basic SS block groups. For example, SS block groups to which the basic bitmap is to be applied may be selected to be separate at maximally equivalent distances. That is, an offset value of 0, 1, 2, or 3 is applied to the 16 basic SS block groups and the basic bitmap is applied to every four SS block groups.

If the value of 4-bit information is 7, 8, 9, 10, 11, 12, 13, or 14, it may indicate that the basic bitmap is applied to two basic SS block groups among the 16 basic SS block groups. For example, SS block groups to which the basic bitmap is to be applied may be selected to be separate at maximally equivalent distances. That is, an offset value of 0, 1, 2, 3, 4, 5, 6, or 7 is applied to the 16 basic SS block groups and the basic bitmap is applied to every eight SS block groups.

As an additional example of embodiment 1-3, if the frequency range is 3 GHz to 6 GHz, an extended basic bitmap with a 2*L_base bit size may be used instead of using the basic bitmap with the L_base bit size and application pattern indication information of the basic bitmap with the additional 2-bit size.

For example, if the frequency range is less than or equal to 3 GHz, the terminal may be informed a time index of an SS block corresponding to a time location of an actual transmission SS block using the basic bitmap with the L_base bit size included in RMSI or an NR-MIB transmitted through an NR-PBCH.

If the frequency range is 3 GHz to 6 GHz, the terminal may be informed the time index of the SS block corresponding to the time location of the actual transmission SS block by applying the extended basic bitmap with the 2*L_base bit size included in the RMSI or the NR-MIB transmitted through the NR-PBCH to an extended basic SS block group including 2*L_base SS blocks. For example, the actual transmission SS block may be indicated based on a unit of eight SS blocks within an SS burst set using an 8-bit bitmap.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and basic bitmap application pattern indication information of an additional 4-bit or 5-bit size.

In the aforementioned embodiments 1-2 and 1-3, the basic bitmap application pattern is provided as an example only and order of O/X patterns shown in Table 1 to Table 6 may be differently defined. That is, a bit value that maps a specific O/X pattern may vary. For example, in Table 5, the bit value of 2 (=00001) indicates an O/X pattern in which the offset value is 0 and the bit value of 3 (=00010) indicates an O/X pattern in which the offset value is 1. Dissimilar thereto, the bit value of 2 may indicate an O/X pattern in which the offset value is 1 and the offset value of 3 may indicate an O/X pattern in which the offset value is 0.

Embodiment 1-4

The present embodiment relates to a method of further defining and using additional 1-bit information indicating a bitmap bit complement with respect to each of the frequency range examples described above in embodiment 1-2.

Here, a bit complement indicates that, if the bit value is 0, 1 is conversely applied and, if the bit value is 1, 0 is conversely applied. For example, if a 4-bit bitmap includes 1001, a result of applying the bit complement to the 4-bit bitmap is 0110.

If a value of an additional 1 bit indicating the bit complement is 0, an actual transmission SS block may be indicated in the same manner as that in embodiment 1-2.

If the value of the additional 1 bit indicating the bit complement is 1, the bit complement may be alternately applied with respect to basic SS block groups corresponding to a pattern to which the basic bitmap is applied in examples of embodiment 1-2. For example, among basic SS block groups corresponding to 0 among 0/X patterns shown in Table 1 to Table 3, the basic bitmap may be applied as is to odd basic SS block groups and a bit map to which the bit complement is applied may be applied to even basic SS block groups.

Embodiment 1-5

The present embodiment relates to a method of further defining and using additional 1-bit information indicating a bitmap bit complement with respect to each of the frequency range examples described above in embodiment 1-3.

If a value of an additional 1 bit indicating the bit complement is 0, an actual transmission SS block may be indicated in the same manner as that in embodiment 1-3.

If the value of the additional 1 bit indicating the bit complement is 1, the bit complement may be alternately applied with respect to basic SS block groups corresponding to a pattern to which the basic bitmap (or the extend basic bitmap) is applied in examples of embodiment 1-3. For example, among basic SS block groups corresponding to 0 among 0/X patterns shown in Table 4 to Table 6, the basic bitmap may be applied as is to odd basic SS block groups and a bit map to which the bit complement is applied may be applied to even basic SS block groups.

Embodiment 1-6

The present embodiment relates to a method of using a basic bitmap or an extended basic bitmap and using additional bitmap information to indicate a time index of an actual transmission SS block with respect to a set of nominal SS blocks greater than a size of the extended basic bitmap. Here, the additional bitmap information may indicate whether to apply the extended basic bitmap.

In detail, a size of an additional bitmap indicating whether to apply the extended basic bitmap may be identical to a number of extended basic SS block groups included in the set of nominal SS blocks.

For example, if the frequency range is less than or equal to 3 GHz, the terminal may be informed a time index of an SS block corresponding to a time location of an actual transmission SS block using a basic bitmap with an L_base bit size included in RMSI or an NR-MIB transmitted through an NR-PBCH.

If the frequency range is 3 GHz to 6 GHz, the terminal may be informed the time index of the SS block corresponding to the time location of the actual transmission SS block by applying an extended basic bitmap with a 2*L_base bit size included in the RMSI or the NR-MIB transmitted through the NR-PBCH to an extended basic SS block group including 2*L_base SS blocks. For example, the actual transmission SS block may be indicated with respect to eight SS blocks within an SS burst set using an 8-bit bitmap.

If the frequency range is 6 GHz to 52.6 GHz, the terminal may be informed the time index of the SS block corresponding to the time location of the actual transmission SS block using the extended basic bitmap with the 2*L_base bit size included in the RMSI or the NR-MIB transmitted through the NR-PBCH and the additional bitmap indicating whether to apply the extended basic bitmap.

For example, if the frequency range is 6 GHz to 52.6 GHz, a maximum of 64 SS blocks (i.e., SS block index #0 to SS block index #63) may be present and eight extended basic SS block groups each including 8 (=2*L_base) SS blocks may be present. The extended basic bitmap may indicate an SS block corresponding to the actual transmission SS block in each extended basic SS block group.

Here, whether to apply the extended basic bitmap with respect to each of the eight extended basic SS block groups may be indicated using an 8-bit additional bitmap. That is, the extended basic bitmap is applied to an extended basic SS block group corresponding to a bit location having a value of ON (or 1) in the 8-bit additional bitmap. Also, the extended basic bitmap is not applied to an extended basic SS block group corresponding to a bit location having a value of OFF (or 0) in the 8-bit additional bitmap and all of the SS blocks included in the extended basic SS block group may be indicated to be not actual transmission SS blocks.

Embodiment 1-7

The present embodiment relates to a method of using a basic bitmap or an extended basic bitmap and using additional bitmap information to indicate a time index of an actual transmission SS block with respect to a set of nominal SS blocks greater than a size of the extended basic bitmap. Here, the additional bitmap information may indicate whether to apply the basic bitmap.

In detail, a size of an additional bitmap indicating whether to apply the basic bitmap may be identical to a number of basic SS block groups included in a set of nominal SS blocks.

For example, if the frequency range is less than or equal to 3 GHz, the terminal may be informed a time index of an SS block corresponding to a time location of an actual transmission SS block using a basic bitmap with an L_base bit size included in RMSI or an NR-MIB transmitted through an NR-PBCH.

If the frequency range is 3 GHz to 6 GHz, the terminal may be informed the time index of the SS block corresponding to the time location of the actual transmission SS block using the basic bitmap with the L_base bit size included in the RMSI or the NR-MIB transmitted through the NR-PBCH and the additional bitmap indicating whether to apply the basic bitmap.

For example, if the frequency range is 3 GHz to 6 GHz, a maximum of eight SS blocks (i.e., SS block index #0 to SS block index #63) may be present and two basic SS block groups each including 4 (=L_base) SS blocks may be present. The basic bitmap may indicate an SS block corresponding to the actual transmission SS block in each basic SS block group.

Here, whether to apply the basic bitmap with respect to each of the two basic SS block groups may be indicated using a 2-bit additional bitmap. That is, the basic bitmap is applied to a basic SS block group corresponding to a bit location having a value of ON (or 1) in the 2-bit additional bitmap. Also, the basic bitmap is not applied to a basic SS block group corresponding to a bit location having a value of OFF (or 0) in the 2-bit additional bitmap and all of the SS blocks included in the basic SS block group may be indicated to be not actual transmission SS blocks.

As an additional example, if the frequency range is 3 GHz to 6 GHz, the terminal may be informed the time index of the SS block corresponding to the time location of the actual transmission SS block by applying an extended basic bitmap with a 2*L_base bit size included in the RMSI or the NR-MIB transmitted through the NR-PBCH to an extended basic SS block group including 2*L_base SS blocks. For example, the actual transmission SS block may be indicated with respect to eight SS blocks within an SS burst set using an 8-bit bitmap.

If the frequency range is 6 GHz to 52.6 GHz, the terminal may be informed the time index of the SS block corresponding to the time location of the actual transmission SS block using the basic bitmap with the L_base bit size included in the RMSI or the NR-MIB transmitted through the NR-PBCH and the additional bitmap indicating whether to apply the basic bitmap.

For example, if the frequency range is 6 GHz to 52.6 GHz, a maximum of 64 SS blocks (i.e., SS block index #0 to SS block index #63) may be present and 16 basic SS block groups each including 4 (=L_base) SS blocks may be present. The basic bitmap may indicate an SS block corresponding to the actual transmission SS block in each basic SS block group.

Here, whether to apply the basic bitmap with respect to each of the 16 basic SS block groups may be indicated using a 16-bit additional bitmap. That is, the basic bitmap is applied to a basic SS block group corresponding to a bit location having a value of ON (or 1) in the 16-bit additional bitmap. Also, the basic bitmap is not applied to a basic SS block group corresponding to a bit location having a value of OFF (or 0) in the 16-bit additional bitmap and all of the SS blocks included in the basic SS block group may be indicated to be not actual transmission SS blocks.

Embodiment 2

The present embodiment relates to a method of indicating a number of actual transmission SS blocks. For example, it is assumed that a time index of each corresponding actual transmission SS block is predefined with respect to each of the number of actual transmission SS blocks and is known by a base station and a terminal. Accordingly, through signaling of information indicating the number of actual transmission SS blocks from the base station to the terminal, the terminal may determine a time index of an SS block corresponding to a time location of a corresponding actual transmission SS block.

Here, a maximum number of actual transmission SS blocks may correspond to a number of nominal SS blocks. For example, the number of nominal SS blocks may be a number of nominal SS blocks included in a single SS burst set. In the following description, the number of actual transmission SS blocks is n and a maximum value of n is n_max.

Also, information indicating such an "n" value may be referred to as a "number of actual transmission SS block(s)" signaling field and may be included in an NR-MIB transmitted through an NR-PBCH or may be provided through RMSI.

Additionally, the base station may instruct the terminal to combine an n value and an offset value. Here, the offset value is referred to as "a". A time index acquired by adding an "a" value to a predefined time index of an actual transmission SS block corresponding to the "n" value may be determined as a final time index of the actual transmission SS block.

Also, information indicating the "n" value and the "a" value may be referred to as a "number and offset of actual transmission SS block" signaling field and may be included in the NR-MIB transmitted through the NR-PBCH or may be provided through the RMSI.

Embodiment 2-1

The present embodiment relates to a method of informing the terminal of a time index of an SS block corresponding to a time location of an actual transmission SS block through a "number of actual transmission SS block(s)" of a maximum of 6 bits, included in RMSI or an NR-MIB transmitted through an NR-PBCH.

If the frequency range is less than or equal to 3 GHz, a maximum of four SS blocks (i.e., SS block index #0 to SS block index #3) may be present. Here, four values, 1 to 4, are available for the "number of actual transmission SS block (s)". Since there is a need to indicate one of the following four cases in total, it may be defined as 2-bit information:

1 SS block: SS block index #0 is used.
2 SS blocks: SS block indices #0 and #2 are used.
3 SS blocks: SS block indices #0, #1, and #2 are used.
4 SS blocks: SS block indices #0, #1, #2, and #3 are used.

If the frequency range is 3 GHz to 6 GHz, a maximum of eight SS blocks (i.e., SS block index #0 to SS block index #7) may be present. Here, eight values, 1 to 8, are available for the "number of actual transmission SS block(s)". Since there is a need to indicate one of the following eight cases in total, it may be defined as 3-bit information:

1 SS block: SS block index #0 is used.
2 SS blocks: SS block indices #0 and #4 are used.
3 SS blocks: SS block indices #0, #2, and #4 are used.
4 SS blocks: SS block indices #0, #2, #4, and #6 are used.
5 SS blocks: SS block indices #0, #1, #2, #4, and #6 are used.
6 SS blocks: SS block indices #0, #1, #2, #3, #4, and #6 are used.
7 SS blocks: SS block indices #0, #1, #2, #3, #4, #5, and #6 are used.
8 SS blocks: SS block indices #0, #1, #2, #3, #4, #5, #6, and #7 are used.

If the frequency range is 6 GHz to 52.6 GHz, a maximum of 64 SS blocks (i.e., SS block index #0 to SS block index #63) may be present. Here, 64 values, 1 to 64, are available for the "number of actual transmission SS block(s)". Since there is a need to indicate one of the following 64 cases in total as shown in the following Table 7, it may be defined as 6-bit information.

TABLE 7

| Number of actual SS blocks | 1 | 2 | 3 | 4 | 5 | 6 | 1 | 8 | 9 | 10 | 11 | 12 | 13 | 14 | 15 | 16 |
|---|---|---|---|---|---|---|---|---|---|---|---|---|---|---|---|---|
| Added SS block index | 0 | 32 | 16 | 48 | 8 | 24 | 40 | 56 | 4 | 12 | 20 | 28 | 36 | 44 | 52 | 60 |
| Number of actual SS blocks | 17 | 18 | 19 | 20 | 21 | 22 | 23 | 24 | 25 | 26 | 27 | 28 | 29 | 30 | 31 | 32 |
| Added SS block index | 2 | 6 | 10 | 14 | 18 | 22 | 26 | 30 | 34 | 38 | 42 | 46 | 50 | 54 | 58 | 62 |
| Number of actual SS blocks | 33 | 34 | 35 | 36 | 37 | 38 | 39 | 40 | 41 | 42 | 43 | 44 | 45 | 46 | 47 | 48 |
| Added SS block index | 1 | 3 | 5 | 7 | 9 | 11 | 13 | 15 | 17 | 19 | 21 | 23 | 25 | 27 | 29 | 31 |
| Number of actual SS blocks | 49 | 50 | 51 | 52 | 53 | 54 | 55 | 56 | 57 | 58 | 59 | 60 | 61 | 62 | 63 | 64 |
| Added SS block index | 33 | 35 | 37 | 39 | 41 | 43 | 45 | 47 | 49 | 51 | 53 | 55 | 57 | 59 | 61 | 63 |

Table 7 shows a time index of an SS block added one by one according to an increase in a value of the "number of actual transmission SS block(s)". For example, if the number of actual transmission SS blocks is 7, SS blocks whose time indices are #0, #32, #16, #48, #8, and #24 may be time indices of the actual transmission SS blocks.

Here, if a value for the "number of actual SS block(s)" is n, an $n^{th}$ added SS block index may be represented as shown in the following Equation 1:

$$\frac{64}{2^{\lceil log_2 n \rceil}} \left( 2 \cdot \left( n - 2^{\lceil log_2 n \rceil - 1} \right) - 1 \right) \quad \text{[Equation 1]}$$

In Equation 1, ⌈x⌉ denotes a smallest integer among integers greater than or equal to x.

Embodiment 2-2

The present embodiment relates to a method of informing the terminal of a time index of an SS block corresponding to a time location of an actual transmission SS block through a maximum of 3 bits of a "number of actual transmission SS block(s)" included in RMSI or an NR-MIB transmitted through an NR-PBCH.

If the frequency range is less than or equal to 3 GHz, a maximum of four SS blocks (i.e., SS block index #0 to SS block index #3) may be present. Here, an available value for the "number of actual transmission SS block(s)" is 1, 2, or 4. Since there is a need to indicate one of the following three cases in total, it may be defined as 2-bit information.
- 1 SS block: SS block index #0 is used.
- 2 SS blocks: SS block indices #0 and #2 are used.
- 4 SS blocks: SS block indices #0, #1, #2, and #3 are used.

As an additional example, if the frequency range is less than or equal to 3 GHz, four values, 1 to 4, are available for the "number of actual transmission SS block(s)". Since there is a need to indicate one of the following four cases in total, it may be defined as 2-bit information.
- 1 SS block: SS block index #0 is used.
- 2 SS blocks: SS block indices #0 and #2 are used.
- 3 SS blocks: SS block indices #0, #1, and #2 are used.
- 4 SS blocks: SS block indices #0, #1, #2, and #3 are used.

If the frequency range is 3 GHz to 6 GHz, a maximum of eight SS blocks (i.e., SS block index #0 to SS block index #7) may be present. Here, 1, 2, 4, or 8 is available for the "number of actual transmission SS block(s)". Since there is a need to indicate one of the following four cases in total, it may be defined as 2-bit information.
- 1 SS block: SS block index #0 is used.
- 2 SS blocks: SS block indices #0 and #4 are used.
- 4 SS blocks: SS block indices #0, #2, #4, and #6 are used.
- 8 SS blocks: SS block indices #0, #1, #2, #3, #4, #5, #6, and #7 are used As an additional example, if the frequency range is 3 GHz to 6 GHz, a maximum of eight SS blocks (i.e., SS block index #0 to SS block index #7) may be present. Here, eight values, 1 to 8, are available for the "number of actual transmission SS block(s)". Since there is a need to indicate one of the following eight cases in total, it may be defined as 3-bit information:
- 1 SS block: SS block index #0 is used.
- 2 SS blocks: SS block indices #0 and #4 are used.
- 3 SS blocks: SS block indices #0, #2, and #4 are used.
- 4 SS blocks: SS block indices #0, #2, #4, and #6 are used.
- 5 SS blocks: SS block indices #0, #1, #2, #4, and #6 are used.
- 6 SS blocks: SS block indices #0, #1, #2, #3, #4, and #6 are used.
- 7 SS blocks: SS block indices #0, #1, #2, #3, #4, #5, and #6 are used.
- 8 SS blocks: SS block indices #0, #1, #2, #3, #4, #5, #6, and #7 are used.

If the frequency range is 6 GHz to 52.6 GHz, a maximum of 64 SS blocks (i.e., SS block index #0 to SS block index #63) may be present. Here, 1, 2, 4, 8, 16, 32, or 64 may be available for the "number of actual transmission SS block(s)". Since there is a need to indicate one of the seven cases in total, it may be defined as 3-bit information.
- 1 SS block: SS block index #0 is used.
- 2 SS blocks: SS block indices #0 and #32 are used (i.e., #32*k (k=0, 1)).
- 4 SS blocks: SS block indices #0, #16, #32, and #48 are used (i.e., #16*k (k=0, 1, 2, 3)).
- 8 SS blocks: SS block indices #0, #8, #16, #24, #32, #40, #48, and #56 are used (i.e., #8*k (k=0, 1, . . . , 7)).
- 16 SS blocks: SS block index #4*k is used (k=0, 1, . . . , 15).
- 32 SS blocks: SS block index #2*k is used (k=0, 1, . . . , 31).
- 64 SS blocks: SS block index #k is used (k=0, 1, . . . , 63).

Embodiment 2-3

The present embodiment relates to a method of indicating a combination of a number of actual transmission SS blocks (i.e., "n" value) and an offset value (i.e., "a" value). In detail, the present embodiment relates to a method of informing the terminal of a time index of an SS block corresponding to a time location of an actual transmission SS block through a maximum of 7 bits of a "number and offset of actual transmission SS block(s)" included in RMSI or an NR-MIB transmitted through a NR-PBCH.

If the frequency range is less than or equal to 3 GHz, a maximum of four SS blocks (i.e., SS block index #0 to SS block index #3) may be present. Here, 1, 2, or 4 may be an "n" value available for the "number of actual transmission SS block(s)". Also, a number of cases for an offset value applicable to each n value may be 4, 2, and 1. That is, since there is a need to indicate one of the following seven cases in total, the "number and offset of actual transmission SS block(s)" may be defined as 3-bit information:
- 1 SS block: If SS block index #0+a is used, offset a uses a total of four cases, 0, 1, 2, and 3.
- 2 SS blocks: If SS block indices #0+a and #2+a are used, offset a uses a total of two cases, 0 and 1.
- 4 SS blocks: If SS block indices #0, #1, #2, and #3 are used, a total of a single case is used.

If the frequency range is 3 GHz to 6 GHz, a maximum of eight SS blocks (i.e., SS block index #0 to SS block index #7) may be present. Here, 1, 2, 4, or 8 may be the "n" value available for the "number of actual transmission SS block(s)". Also, a number of cases for an offset value applicable to each "n" value may be 8, 4, 2, or 1. That is, since there is a need to indicate one of the following 15 cases in total, the "number and offset of actual transmission SS block(s)" may be defined as 4-bit information.
- 1 SS block: If SS block index #0+a is used, offset a uses a total of eight cases, 0, 1, . . . , 7.
- 2 SS blocks: If SS block indices #0+a and #4+a are used, offset a uses a total of four cases, 0, 1, 2, and 3.
- 4 SS blocks: If SS block indices #0+a, #2+a, #4+a, and #6+a are used, offset a uses a total of two cases, 0 and 1.
- 8 SS blocks: If SS block indices #0, #1, #2, #3, #4, #5, #6, and #7 are used.

If the frequency range is 6 GHz to 52.6 GHz, a maximum of 64 SS blocks (i.e., SS block index #0 to SS block index #63) may be present. Here, 1, 2, 4, 8, 16, 32, or 64 may be the "n" value available for the "number of actual transmission SS block(s)". Also, a number of cases for an offset value applicable to each n value may be 64, 32, 16, 8, 4, 2, or 1. That is, since there is a need to indicate one of the following 127 cases in total, the "number and offset of actual transmission SS block" may be define as 7-bit information:
- 1: In the case of using SS block index #0+a, offset a uses a total of 64 cases, 0, 1, . . . , 63.

2: In the case of using SS block index #32n+a (n=0, 1), offset a uses a total of 32 cases, 0, 1, . . . , 31.
4: In the case of using SS block index #16n+a (n=0, 1, 2, 3), offset a uses a total of 16 cases, 0, 1, . . . , 15.
8: In the case of using SS block index #8n+a (n=0, 1, . . . , 7), offset a uses a total of eight cases, 0, 1, . . . , 7.
16: In the case of using SS block index #4n+a (n=0, 1, . . . , 15), offset a uses a total of four cases, 0, 1, 2, and 3.
32: In the case of using SS block index #2n+a (n=0, 1, . . . , 31), offset a uses a total of two cases, 0 and 1.
64: In the case of using SS block index #n (n=0, 1, . . . , 63), a total of a single case is used.

As an additional example, if a minimum number of SS blocks to be transmitted is present in each frequency range, it a time index of an SS block corresponding to a time location of an actual transmission SS block may be indicated based on information of a relatively small bit size compared to the aforementioned examples.

For example, if there is a condition that two or more SS blocks need to be used in a case in which the frequency range is 6 GHz to 52.6 GHz, the "number and offset of actual transmission SS block" may be defined as a 6-bit size.

In detail, if the frequency range is 6 GHz to 52.6 GHz, a maximum of 64 SS blocks (i.e., SS block index #0 to SS block index #63) may be present. Here, 2, 4, 8, 16, 32, or 64 may be the "n" value available for the "number of actual transmission SS block(s)". Also, a number of cases for an offset value applicable to each n value may be 32, 16, 8, 4, 2, or 1. That is, since there is a need to indicate one of the following 63 cases in total, the "number and offset of actual transmission SS block(s)" may be defined as 6-bit information:

2: In the case of using SS block index #32n+a (n=0, 1), offset a uses a total of 32 cases, 0, 1, . . . , 31.
4: In the case of using SS block index #16n+a (n=0, 1, 2, 3), offset a uses a total of 16 cases, 0, 1, . . . , 15.
8: In the case of using SS block index #8n+a (n=0, 1, . . . , 7), offset a uses a total of eight cases, 0, 1, . . . , 7.
16: In the case of using SS block index #4n+a (n=0, 1, . . . , 15), offset a uses a total of four cases, 0, 1, 2, and 3.
32: In the case of using SS block index #2n+a (n=0, 1, . . . , 31), offset a uses a total of two cases, 0 and 1.
64: In the case of using SS block index #n (n=0, 1, . . . , 63), a total of a single case is used.

Embodiment 3

The present embodiment relates to a method of indicating a time index of an SS block corresponding to a time location of a next actual transmission SS block in each SS block.

For example, the terminal may succeed in an SS detection in a single SS block and may acquire a "next actual transmission SS block index" from an NR-MIB transmitted through an NR-PBCH included in the corresponding SS block based thereon. Accordingly, the terminal may not attempt the SS detection in a nominal SS block not corresponding to the "next actual transmission SS block index" and may attempt the SS detection only in an SS block indicated by the "next actual transmission SS block index", thereby reducing a power consumption. Accordingly, the terminal may sequentially determine the next actual transmission SS block.

Embodiment 3-1

The present embodiment relates to a method of indicating a "next actual transmission SS block index" included in an NR-MIB transmitted through an NR-PBCH within each SS block.

A maximum of 6 bits of "SS block time index" information may be explicitly or implicitly included in the NR-MIB transmitted through the NR-PBCH included in each SS block. Here, the "SS block time index" information indicates a time index of a current SS block.

Additionally, "next actual transmission SS block index" information indicating a time index (i.e., a time index of a just next actual transmission SS block of the current SS block) of an actual transmission SS block mostly initially present among SS blocks present within an SS burst set after the current SS block may be included in the NR-MIB and thereby indicated.

The "next actual transmission SS block index" information may be defined as a maximum of 6-bit information as follows.

For example, if the frequency range is less than or equal to 3 GHz, a maximum of four SS blocks (i.e., SS block index #0 to SS block index #3) may be present and the "next actual transmission SS block index" may be defined as a 2-bit size. For example, a time index of an SS block indicated by a bit value of the "next actual transmission SS block index" may follow as:
01: SS block index #1
10: SS block index #2
11: SS block index #3
00: indicates that there is no more actual transmission SS block within an SS burst set.

If the frequency range is 3 GHz to 6 GHz, a maximum of eight SS blocks (i.e., SS block index #0 to SS block index #7) may be present and the "next actual transmission SS block index" may be defined as a 3-bit size. For example, a time index of an SS block indicated by a bit value of the "next actual transmission SS block index" may follow as:
001: SS block index #1
010: SS block index #2
. . .
111: SS block index #7
000: indicates that there is no more actual transmission SS block within an SS burst set.

If the frequency range is 6 GHz to 52.6 GHz, a maximum of 64 SS blocks (i.e., SS block index #0 to SS block index #63) may be present and the "next actual transmission SS block index" may be defined as a 6-bit size. For example, a time index of an SS block indicated by a bit value of the "next actual transmission SS block index" may follow as:
000001: SS block index #1
000010: SS block index #2
. . .
111111: SS block index #63
000000: indicates that there is no more actual transmission SS block within an SS burst set.

Embodiment 3-2

The present embodiment relates to a method of implicitly indicating the "next actual transmission SS block index" using a sequence or a scrambling value of a PBCH demodulation reference signal (DM-RS) within an SS block.

A DM-RS may be present within a PBCH included in each SS block and may be transmitted over two symbols. An "SS block time index" may be indicated using a sequence or a scrambling value of a DM-RS that maps one of the two symbols. For example, a first sequence (or a first scrambling value) may indicate a first SS block time index and a second sequence (or a second scrambling value) may indicate a second SS block time index. The SS block time index indicates a time index of a current SS block.

Additionally, "next actual transmission SS block index" information indicating a time index (i.e., a time index of a just next actual transmission SS block of the current SS block) of an actual transmission SS block mostly initially present among SS blocks present within an SS burst set after the current SS block may be indicated through a DM-RS that maps another symbol. For example, once an index of the current SS block is indicated through a DM-RS of a first symbol, a "next actual transmission SS block index" may be indicated through a DM-RS of a second symbol. For example, a first sequence (or a first scrambling value) of the DM-RS of the second symbol may indicate a first next actual transmission SS block index and a second sequence (or a first scrambling value) of the DM-RS of the second symbol may indicate a second next actual transmission SS block index.

Here, a maximum of 64 sequences (or scrambling values) may be distinguished from each other. A maximum of 64 different next actual transmission SS block indices may be indicated using the sequence or the scrambling value of the PBCH DM-RS.

For example, if the frequency range is less than or equal to 3 GHz, a maximum of four SS blocks (i.e., SS block index #0 to SS block index #3) may be present and four sequences (or scrambling values) may be used for the "next actual transmission SS block index". For example, SS block indices indicated by different sequences may follow as:

Sequence #1: SS block index #1
Sequence #2: SS block index #2
Sequence #3: SS block index #3
Sequence #0: indicates that there is no more actual transmission SS block within an SS burst set.

If the frequency range is 3 GHz to 6 GHz, a maximum of eight SS blocks (i.e., SS block index #0 to SS block index #7) may be present and eight sequences (or scrambling values) may be used for the "next actual transmission SS block index". For example, SS block indices indicated by different sequences may follow as:

Sequence #1: SS block index #1
Sequence #2: SS block index #2
. . .
Sequence #7: SS block index #7
Sequence #0: indicates that there is no more actual transmission SS block within an SS burst set.

If the frequency range is 6 GHz to 52.6 GHz, a maximum of 64 SS blocks (i.e., SS block index #0 to SS block index #63) may be present and 64 sequences (or scrambling values) may be used for the "next actual transmission SS block index". For example, SS block indices indicated by different sequences may follow as:

Sequence #1: SS block index #1
Sequence #2: SS block index #2
. . .
Sequence #63: SS block index #63
Sequence #0: indicates that there is no more actual transmission SS block within an SS burst set.

Embodiment 3-3

The present embodiment relates to a method of indicating a relative time interval from each SS block to a next actual transmission SS block.

For example, a "time interval to next actual transmission SS block index" may be defined and used as a signaling field included in an NR-MIB transmitted through an NR-PBCH. The "time interval to next actual transmission SS block index" may be defined to indicate a difference value from a current SS block index to a just next actual transmission SS block index.

"Time interval to next actual transmission SS block index" information may be defined as a maximum of 6-bit information as follows:

For example, if the frequency range is less than or equal to 3 GHz, a maximum of four SS blocks (i.e., SS block index #0 to SS block index #3) may be present and the "time interval to next actual transmission SS block index" may be defined as a 2-bit size. That is, 2-bit information may be defined to indicate one of a maximum of four cases, a case in which a first next SS block of a current SS block is the next actual transmission SS block, a case in which a second next SS block of the current SS block is the next actual transmission SS block, a case in which a third next SS block of the current SS block is the next actual transmission SS block, and a case in which there is no next actual transmission SS block.

For example, if an index of the current SS block is #0, an index of the just next actual transmission SS block may be #1, #2, #3, or absent, which corresponds to a case in which a time interval is 1, 2, 3, or 0.

If the index of the current SS block is #1, the index of the just next actual transmission SS block may be #2, #3, or absent, which corresponds to a case in which the time interval is 1, 2, or 0.

If the index of the current SS block is #2, the index of the just next actual transmission SS block may be #3 or absent, which corresponds to a case in which the time interval is 1 or 0.

If the index of the current SS block is #3, the index of the just next actual transmission SS block may be absent, which corresponds to a case in which the time interval is 0.

As described above, the next actual transmission SS block may be indicated using information indicating a time interval with a maximum 2-bit size.

If the frequency range is 3 GHz to 6 GHz, a maximum of eight blocks (i.e., SS block index #0 to SS block index #7) may be present and the "time interval to next actual transmission SS block index" may be defined as a 3-bit size. That is, 3-bit information may be defined to indicate one of a maximum of eight cases, cases in which the respective ones of a first next SS block, a second next SS block, a third next SS block, . . . , a seventh next SS block of the current block correspond to the next actual transmission SS block, and a case in which there is no next actual transmission SS block.

If the frequency range is 6 GHz to 52.6 GHz, a maximum of 64 SS blocks (i.e., SS block index #0 to SS block index #7) may be present and the "time interval to next actual transmission SS block index" may be defined as a 6-bit size. That is, 6-bit information may be defined to indicate one of a maximum of 64 cases, cases in which the respective ones of a first next SS block, a second next SS block, a third next SS block, . . . , a $63^{rd}$ next SS block correspond to the next actual transmission SS block, and a case in which there is no next actual transmission SS block.

In the aforementioned embodiment 1 to embodiment 3, a number of bits of a signaling field included in RMSI or the NR-MIB transmitted through the NR-PBCH may differ based on each frequency range. Referring to embodiment 2-3, the number of bits is 3 bits if the frequency range is less than or equal to 3 GHz, 4 bits if the frequency range is 3 GHz to 6 GHz, and 6 bits or 7 bits if the frequency range is 6 GHz to 52.6 GHz. That is, the number of bits indicated may differ based on each frequency range.

However, the number of bits may be unified based on a case in which a largest number of bits is used. In this case, if a least number of bits is used, a bit value of a remaining bit(s) may be zero padded. Referring again to embodiment 2-3, if 7 bits are used for the frequency range of 6 GHz to 52.6 GHz, the same 7 bits may be used by adding four bits of zero padding to three bits if the frequency range is less than or equal to 3 GHz and by adding three bits of zero padding to four bits if the frequency range is 3 GHz to 6 GHz.

Figure 5:
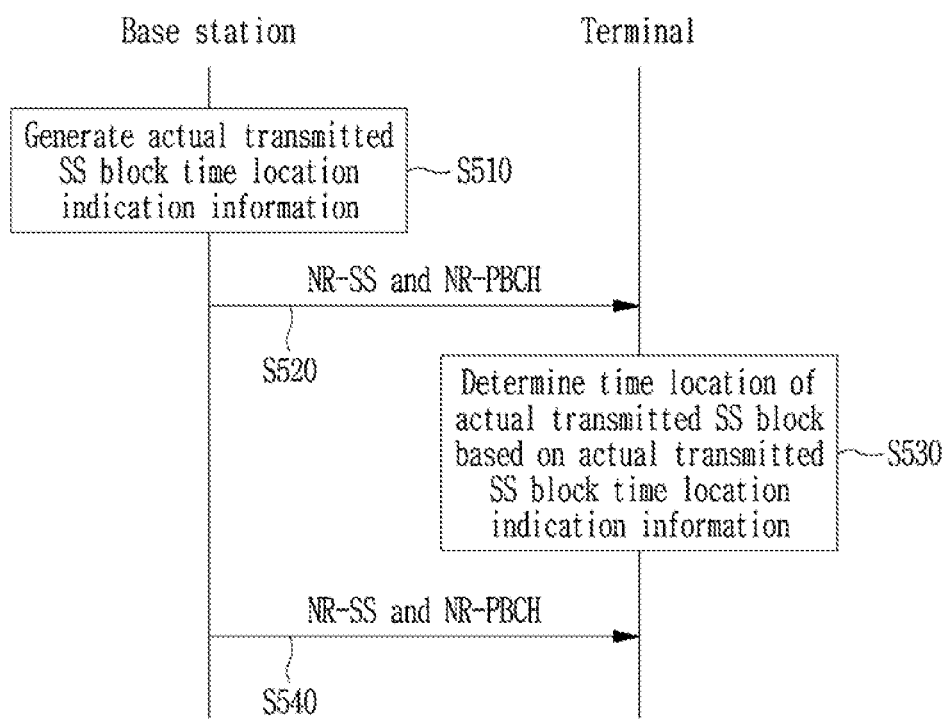
FIG. 5 is a flowchart illustrating a method of signaling a time location of an SS block.

FIG. 5 is a flowchart illustrating a method of signaling a time location of an SS block according to the present disclosure.

Referring to FIG. 5, in operation S510, a base station may generate information indicating a time location of an actual transmission SS block. For example, as described above in various examples of embodiment 1, information indicating the time location of the actual transmission SS block may include at least one of basic bitmap information, extended basic bitmap information, basic bitmap application pattern indication information, extended basic bitmap application pattern indication information, offset information, information indicating a bit complement, information indicating whether to apply the basic bitmap, and information indicating whether to apply the extended basic bitmap. Additionally or alternatively, as described above in various examples of embodiment 2, information indicating the time location of the actual transmission SS block may include at least one of information on the number of actual transmission SS blocks and offset information. Additionally or alternatively, as described above in various examples of embodiment 3, information indicating the time location of the actual transmission SS block may include at least one of information indicating the time location of the next actual transmission SS block and information indicating the time interval.

For example, the base station may generate SS block location information indicating a time domain location of an actual transmission SS block in an SS burst set. The SS block location information may include at least one of a first bitmap and a second bitmap. In detail, the SS block location information may include the first bitmap or may include the first bitmap and the second bitmap based on a frequency range (or an operational band) of a radio communication system. For example, when the radio communication system operates in a first frequency range, the SS block location information may include the first bitmap. Alternatively, when the radio communication system operates in a second frequency range, the SS block location information may include the first bitmap and the second bitmap. In detail, the first frequency range may be less than or equal to 6 GHz and the second frequency range may be greater than 6 GHz.

The first bitmap may indicate a location of an actual transmission SS block in a single group. For example, the first bitmap may correspond to the basic bitmap information or the extended basic bitmap information described in the examples of the present disclosure. That is, the first bitmap may be configured as information indicating the actual transmission SS block in a single group (e.g., a basic SS block group or an extended basic SS block group). Here, the single group may include a maximum of eight consecutive SS blocks. The first bitmap may be defined to have a size of 8 bits. In this case, an SS block index corresponding to the actual transmission SS block may be indicated with respect to a maximum of eight SS blocks in a single group.

The second bitmap may indicate the group in which the actual transmission SS block is present. For example, the second bitmap may correspond to the additional bitmap described above in the examples of the present disclosure. The second bitmap may be configured as information indicating the group that includes the actual transmission SS block among a plurality of groups (e.g., a plurality of basic SS block groups or a plurality of extended basic SS block groups). The second bitmap may be defined to have a size of 8 bits and indicate a group index of the group in which the actual transmitted SS block is present with respect to a maximum of eight groups.

The second bitmap may indicate a presence of a plurality of groups each including the actual transmission SS block. In this case, a location of the actual transmission SS block may be identical in each of the plurality of groups. That is, a location or a pattern of the actual transmission SS block in a first group may be identical to a location or a pattern of the actual transmission SS block in a second group.

In operation S520, the base station may transmit an SS block including an NR-SS (NR-PSS and NR-SSS) and an NR-PBCH to the terminal. Here, the actual transmission SS block time location indication information generated in operation S510 may be included in the SS block. For example, the actual transmission SS block time location indication information may be provided to the terminal through the NR-MIB transmitted through the NR-PBCH or NR-PBCH DM-RS.

Although not illustrated in FIG. 5, the actual transmission SS block time location indication information may be provided to the terminal in a form of RMSI through an NR-PDSCH indirectly indicated by the SS block that includes the NR-SS and the NR-PBCH. For example, the base station may transmit, to the terminal through the RMSI, an upper layer message including the SS block location information of operation S510.

In operation S530, the terminal may determine the time location of the actual transmission SS block based on the actual transmission SS block time location indication information that is signaled from the base station. For example, the terminal may attempt to receive the SS block using a blind detection scheme before acquiring information on the time location of the actual transmission SS block. Once the NR-SS and the NR-PBCH are detected in the SS block, the terminal may accurately determine a time location of a next transmitted SS block based on the actual transmission SS block time location indication information included in the detected NR-SS and NR-PBCH.

For example, the terminal may receive the upper layer message including the SS block location information transmitted from the base station through the RMSI and may verify a time domain location of the actual transmission SS block based on the first bitmap or the first bitmap and the second bitmap included in the SS block location information.

In operation S540, the terminal may accurately receive an NR-SS and an NR-PBCH included in a next SS block at a corresponding time location based on the SS block time location that is determined based on the actual transmission SS block time location indication information signaled from the base station.

For example, when the terminal receives the SS block location information from the base station through the upper layer message, the terminal may not receive another signal or another channel in a radio resource indicated by the actual transmission SS block based on the SS block location information and may receive at least one of the NR-PSS, the NR-SSS, and the NR-PBCH.

As an additional example, the base station may transmit, to the terminal, frequency band information indicating a frequency band to be used by the terminal. The frequency band information may be transmitted from the base station to the terminal before performing operation S510, at the same time of operation S510, or after operation S510. In detail, the frequency band information may be indicated from the base station to the terminal before operation S530.

Also, the base station may transmit system information including parameters to the terminal. The system information including parameters may be transmitted from the base station to the terminal before operation S520, at the same time of operation S520, or after operation S520. In detail, the system information including parameters may be transmitted from the base station to the terminal before operation S530.

The parameters may include the first bitmap indicating a location of at least one SS block included in a single group and the second bitmap indicating at least one group from which at least one SS block is transmitted. The system information including the parameters may be RMSI. Also, the location indicated by the first bitmap may be a time domain location of at least one SS block included in a single group. The first bitmap may include 8 bits and may indicate transmission of a maximum of eight SS blocks within a single group of an SS burst set. The second bitmap may include 8 bits and may indicate whether a maximum of eight groups are present within the SS burst set. Also, if the frequency band used by the terminal satisfies a threshold frequency, the second bitmap may indicate whether a plurality of groups is present within the SS burst set. For example, if the frequency band used by the terminal is greater than 6 GHz, the second bitmap may be included in the parameters.

The base station may generate at least one SS block including a physical broadcast channel and a synchronization signal. Also, the base station may include and thereby transmit the generated at least one SS block in the at least one group based on the parameters. Such SS block transmission may be performed in operation S540.

Also, the terminal may receive the system information including the parameters from the base station before operation S530. In operation S530, the terminal may determine at least one SS block included in each of at least one group based on the parameters received from the base station. In operation S540, the terminal may detect the physical broadcast channel and the synchronization signal from each of the determined SS blocks.

Figure 6:
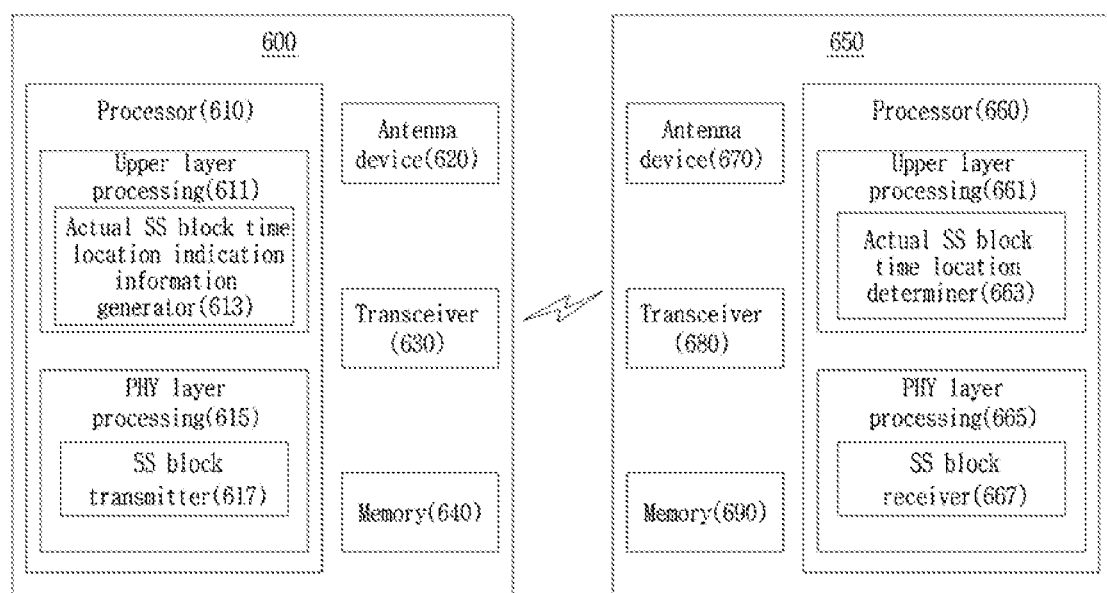
FIG. 6 is a block diagram illustrating a configuration of a radio device.

FIG. 6 is a diagram illustrating a configuration of a radio device according to the present disclosure.

FIG. 6 illustrates a base station device 600 configured to transmit a synchronization signal and a broadcast channel signal and a terminal device 650 configured to receive the synchronization signal and the broadcast channel signal.

Referring to FIG. 6, the base station device 600 may include a processor 610, an antenna device 620, a transceiver 630, and a memory 640.

The processor 610 may perform baseband-related signal processing and may include an upper layer processing 611 and a physical (PHY) layer processing 615. The upper layer processing 611 may process an operation of a Medium Access Control (MAC) layer, a Radio Resource Control (RRC) layer, or more upper layers. The PHY layer processing 615 may process an operation (e.g., downlink (DL) transmission signal processing and uplink (UL) received signal processing) of a PHY layer. The processor 610 may control the overall operation of the base station device 600 in addition to performing the baseband-related signal processing.

The antenna device 620 may include at least one physical antenna. If the antenna device 620 includes a plurality of antennas, Multiple Input multiple Output (MIMO) transmission and reception may be supported. The transceiver 630 may include a radio frequency (RF) transmitter and an RF receiver. The memory 640 may store operation processed information of the processor 610 and software, an operating system (OS), an application, etc., associated with an operation of the base station device 600, and may include a component such as a buffer.

The processor 610 of the base station device 600 may be configured to implement an operation of the base station in the embodiments disclosed herein.

The upper layer processing 611 of the processor 610 may include an actual SS block time location indication information generator 613. For example, as described above in various examples of embodiment 1, the actual SS block time location indicating generator 613 may generate information including at least one of basic bitmap information, extended basic bitmap information, basic bitmap application pattern indication information, extended basic bitmap application pattern indication information, offset information, information indicating a bit complement, information indicating whether to apply the basic bitmap, and information indicating whether to apply the extended basic bitmap. Additionally or alternatively, as described above in various examples of embodiment 2, the actual SS block time location indicating generator 613 may generate information including at least one of information on the number of actual transmission SS blocks and offset information. Additionally or alternatively, as described above in various examples of embodiment 3, the actual SS block time location indicating generator 613 may generate information including at least one of information indicating the time location of the next actual transmission SS block and information on the time interval.

For example, the upper layer processing 611 may generate SS block location information indicating a time domain location of an actual transmission SS block in an SS burst set. The SS block location information may include at least one of a first bitmap and a second bitmap. In detail, the SS block location information may include the first bitmap, or may include the first bitmap and the second bitmap based on a frequency range (or an operational band) of a radio communication system. For example, when the radio communication system operates in the first frequency range, the SS block location information may include the first bitmap. Alternatively, when the radio communication system operates in the second frequency range, the SS block location information may include the first bitmap and the second bitmap. In detail, the first frequency range may be less than or equal to 6 GHz and the second frequency range may be greater than 6 GHz.

The upper layer processing 611 may generate the first bitmap indicating a location of an actual transmission SS block in a single group. For example, the first bitmap may correspond to the basic bitmap information or the extended basic bitmap information in the examples of the present disclosure. That is, the first bitmap may be configured as information indicating the actual transmission SS block in a single group (e.g., a basic SS block group or an extended basic SS block group). Here, the single group may include a maximum of eight consecutive SS blocks. The first bitmap may be defined to have a size of 8 bits. In this case, an SS block index corresponding to the actual transmission SS block may be indicated with respect to a maximum of eight SS blocks in a single group.

The upper layer processing 611 may generate the second bitmap indicating the group in which the actual transmission SS block is present. For example, the second bitmap may correspond to the additional bitmap described in the examples of the present disclosure. The second bitmap may be configured as information indicating the group that includes the actual transmission SS block among a plurality of groups (e.g., a plurality of basic SS block groups or a plurality of extended basic SS block groups). The second bitmap may be defined to have a size of 8 bits and indicate a group index of the group in which the actual transmitted SS block is present with respect to a maximum of eight groups.

The second bitmap may indicate a presence of a plurality of groups each including the actual transmission SS block. In this case, a location of the actual transmission SS block may be identical in each of the plurality of groups. That is, a location or a pattern of the actual transmission SS block in a first group may be identical to a location or a pattern of the actual transmission SS block in the second group.

The PHY layer processing 615 within the processor 610 may include an SS block transmitter 617. The SS block transmitter 617 may transmit an SS block including an NR-SS (NR-PSS and NR-SSS) and an NR-PBCH to the terminal. Here, the SS block transmitter 617 may include, in the SS block, the actual transmission SS block time location indication information generated by the actual SS block time location indication information generator 613 and thereby transmit the SS block. For example, the SS block transmitter 617 may include, in the SS block, the actual transmission SS block time location indication information and thereby transmit the SS block through the NR-MIB transmitted through the NR-PBCH or NR-PBCH. Also, although not illustrated in FIG. 6, the PHY layer processing 615 may transmit, to the terminal, the actual transmission SS block time location indication information in a form of RMSI through the NR-PDSCH indirectly indicated by the SS block that includes the NR-SS and the NR PBCH. For example, the PHY layer processing 615 may transmit an upper layer message including the SS block location information generated by the upper layer processing 611 through the RMSI.

As an additional example, the upper layer processing 611 may generate frequency band information indicating a frequency band to be used by the terminal and may transmit the generated frequency band information to the terminal through the PHY layer processing 615.

Also, the upper layer processing 611 may transmit system information including parameters to the terminal through the PHY layer processing 615.

The parameters may include the first bitmap indicating a location of at least one SS block included in a single group and the second bitmap indicating at least one group from which at least one SS block is transmitted. The system information including the parameters may be RMSI. Also, the location indicated by the first bitmap may be a time domain location of at least one SS block included in a single group. The first bitmap may include 8 bits and may indicate transmission of a maximum of eight SS blocks within a single group of an SS burst set. The second bitmap may include 8 bits and may indicate whether a maximum of eight groups are present within the SS burst set. Also, if the frequency band used by the terminal satisfies a threshold frequency, the second bitmap may indicate whether a plurality of groups is present within the SS burst set. For example, if the frequency band used by the terminal is greater than 6 GHz, the second bitmap may be included in the parameters.

The PHY layer processing 615 may generate at least one SS block including a physical broadcast channel and a synchronization signal. Also, the PHY layer processing 615 may include and thereby transmit the generated at least one SS block in the at least one group based on the parameters generated by the upper layer processing 611.

The terminal device 650 may include a processor 660, an antenna device 670, a transceiver 680, and a memory 690.

The processor 660 may perform baseband-related signal processing and may include an upper layer processing 661 and a PHY layer processing 665. The upper layer processing 661 may process an operation of a MAC layer, an RRC layer, or more upper layers. The PHY layer processing 665 may process an operation (e.g., UL transmission signal processing and DL received signal processing) of a PHY layer. The processor 660 may control the overall operation of the terminal device 650 may control the overall operation of the terminal device 650 in addition to performing the baseband-related signal processing.

The antenna device 670 may include at least one physical antenna. If the antenna device 670 includes a plurality of antennas, MIMO transmission and reception may be supported. The transceiver 680 may include an RF transmitter and an RF receiver. The memory 690 may store operation processed information of the processor 660 and software, an OS, an application, etc., associated with an operation of the terminal device 650, and may include a component such as a buffer.

The processor 660 of the terminal device 650 may be configured to implement an operation of a terminal in the embodiments disclosed herein.

The upper layer processing 661 of the processor 660 may include an actual SS block time location determiner 663. The actual SS block time location determiner 663 may determine a time location of an actual transmission SS block based on actual transmission SS block time location indication information signaled from the base station.

For example, the upper layer processing unit 661 may receive the upper layer message including the SS block location information transmitted from the base station through the RMSI and may verify a time domain location of the actual transmission SS block based on the first bit map or the first bitmap and the second bitmap included in the SS block location information.

The PHY layer processing 665 within the processor 660 may include an SS block receiver 667. The SS block receiver 667 may attempt to receive an SS block using a blind detection scheme before acquiring information on the time location of the actual transmission SS block. Also, the SS block receiver 667 may detect the NR-SS and the NR-PBCH in the SS block and accordingly, may accurately determine a time location of a next transmitted SS block based on the actual transmission SS block time location indication information included therein, and may accurately receive an NR-SS and an NR-PBCH included in the next SS block at the determined SS block time location.

For example, when the terminal receives the SS block location information included in the upper layer message from the base station through the upper layer processing 661, the PHY layer processing 665 may not receive another signal or another channel in a radio resource indicated by the actual transmission SS block based on the SS block location information and may receive at least one of the NR-PSS, the NR-SSS, and the NR-PBCH.

As an additional example, the upper layer processing 661 may receive, from the base station, frequency band information indicating a frequency band to be used by the terminal through the PHY layer processing 665.

Also, the upper layer processing 661 may receive, from the base station, system information including parameters through the PHY layer processing 665.

The parameters may include the first bitmap indicating a location of at least one SS block included in a single group and the second bitmap indicating at least one group from which at least one SS block is transmitted. The system information including the parameters may be RMSI. Also, the location indicated by the first bitmap may be a time domain location of at least one SS block included in a single group. The first bitmap may include 8 bits and may indicate transmission of a maximum of eight SS blocks within a single group of an SS burst set. The second bitmap may include 8 bits and may indicate whether a maximum of eight groups are present within the SS burst set. Also, if the frequency band used by the terminal satisfies a threshold frequency, the second bitmap may indicate whether a plurality of groups is present within the SS burst set. For example, if the frequency band used by the terminal is greater than 6 GHz, the second bitmap may be included in the parameters.

The upper layer processing 661 may determine at least one SS block included in each of the at least one group based on the received parameters, and the PHY layer processing 665 may detect the physical broadcast channel and the synchronization signal from each of the determined SS blocks.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

According to the present disclosure, it is possible to efficiently use radio resources by differently setting a signaling overhead for indicating a time domain location of a transmission of SS block(s) based on a frequency range.

Also, according to the present disclosure, it is possible to minimize a signaling overhead for indicating a time domain location of an actual transmission SS block by applying a first bitmap indicating an SS block in a group in a frequency range greater than a threshold frequency and a second bitmap indicating the group in which the SS block is present.

Effects obtainable from the present disclosure are not limited thereto and other effects not described herein may be explicitly understood by one of ordinary skill in the art to which this disclosure pertains from the description set forth as below.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A wireless user device comprising:
   at least one antenna to receive at least one wireless signal from a base station;
   at least one processor; and
   memory storing instructions that, when executed by the at least one processor, cause the wireless user device to:
   receive first system information comprising a first synchronization signal (SS) block position parameter associated with a first frequency resource, wherein the first SS block position parameter comprises:
   a first bitmap indicating a plurality of groups in which at least one SS block is transmitted, wherein the first frequency resource satisfies a threshold frequency, and wherein each group of the plurality of groups comprises first SS blocks; and
   a second bitmap indicating first positions of the first SS blocks, wherein each first position of the first positions corresponds to a respective SS block of the first SS blocks in each group of the plurality of groups, and
   wherein a size of the first bitmap corresponds to 8 bits and a size of the second bitmap corresponds to 8 bits;
   determine, based on the first bitmap and the second bitmap, the first positions;
   receive, based on the first positions, at least one of the first SS blocks;
   receive second system information comprising a second SS block position parameter associated with a second frequency resource, wherein the second SS block position parameter comprises:
   a third bitmap indicating second positions of second SS blocks, wherein a size of the third bitmap corresponds to 8 bits, wherein the second frequency resource does not satisfy the threshold frequency, and wherein each second position of the second positions corresponds to a respective SS block of the second SS blocks;

determine, based on the third bitmap, the second positions; and receive, based on the second positions, at least one of the second SS blocks.

2. The wireless user device of claim 1, wherein the instructions, when executed by the at least one processor, cause the wireless user device to:
receive the at least one of the first SS blocks via the first frequency resource; and
receive the at least one of the second SS blocks via the second frequency resource,
wherein a frequency of the first frequency resource is higher than the threshold frequency, and
wherein a frequency of the second frequency resource is lower than the threshold frequency.

3. The wireless user device of claim 1, wherein the instructions, when executed by the at least one processor, cause the wireless user device to:
receive, from the base station, information of one or more frequency resources that indicates one or more frequency bands to be used by the wireless user device.

4. The wireless user device of claim 1, wherein the first positions indicated by the second bitmap corresponds to time domain positions of the first SS blocks in each of the plurality of groups.

5. The wireless user device of claim 1, wherein the second bitmap indicates transmission of up to eight SS blocks within a single group of the plurality of groups.

6. The wireless user device of claim 1, wherein the first bitmap indicates presence of size of the first bitt up to eight groups.

7. The wireless user device of claim 1, wherein the third bitmap indicates transmission of up to eight SS blocks.

8. The wireless user device of claim 1,
wherein the first system information is Remaining Minimum System Information (RMSI).

9. The wireless user device of claim 1, wherein the first bitmap indicates at least one second group in which SS blocks are absent, and
wherein the first bitmap indicates that at least one SS block is transmitted, in the plurality of groups, according to the second bitmap.

10. The wireless user device of claim 1, wherein the instructions, when executed by the at least one processor, cause the wireless user device to:
monitor at least one resource for at least one of the first SS blocks, wherein the at least one resource is associated with:
the first positions; and
the first frequency resource.

11. A method performed by a wireless user device, the method comprising:
receiving, from a base station, first system information comprising a first synchronization signal (SS) block position parameter associated with a first frequency resource, wherein the first SS block position parameter comprises:
a first bitmap indicating a plurality of groups in which at least one SS block is transmitted, wherein the first frequency resource satisfies a threshold frequency, and wherein each group of the plurality of groups comprises first SS blocks; and
a second bitmap indicating first positions of the first SS blocks, wherein each first position of the first positions corresponds to a respective SS block of the first SS blocks in each group of the plurality of groups, and
wherein a size of the first bitmap corresponds to 8 bits and a size of the second bitmap corresponds to 8 bits;
determining, based on the first bitmap and the second bitmap, the first positions; and
receiving, based on the first positions, at least one of the first SS blocks;
receiving second system information comprising a second SS block position parameter associated with a second frequency resource, wherein the second SS block position parameter comprises:
a third bitmap indicating second positions of second SS blocks, wherein a size of the third bitmap corresponds to 8 bits, wherein the second frequency resource does not satisfy the threshold frequency, and wherein each second position of the second positions corresponds to a respective SS block of the second SS blocks;
determining, based on the third bitmap, the second positions; and
receiving, based on the second positions, at least one of the second SS blocks.

12. The method of claim 11, further comprising:
receiving the at least one of the first SS blocks via the first frequency resource; and
receiving the at least one of the second SS blocks via the second frequency resource,
wherein a frequency of the first frequency resource is higher than the threshold frequency, and
wherein a frequency of the second frequency resource is lower than the threshold frequency.

13. The method of claim 11, further comprising:
receiving, from the base station, information of one or more frequency resources that indicates one or more frequency bands to be used by the wireless user device.

14. The method of claim 11, wherein the first positions indicated by the second bitmap corresponds to time domain positions of the first SS blocks in each of the plurality of groups.

15. The method of claim 11, wherein the second bitmap indicates transmission of up to eight SS blocks within a single group of the plurality of groups.

16. The method of claim 11, wherein the first bitmap indicates presence of up to eight groups.

17. The method of claim 11, wherein the third bitmap indicates transmission of up to eight SS blocks.

18. The method of claim 11,
wherein the first system information is Remaining Minimum System Information (RMSI).

19. The method of claim 11, wherein the first bitmap indicates at least one second group in which SS blocks are absent, and
wherein the first bitmap indicates that at least one SS block is transmitted, in the plurality of groups, according to the second bitmap.

20. The method of claim 11, further comprising:
monitoring at least one resource for at least one of the first SS blocks, wherein the at least one resource is associated with:
the first positions; and
the first frequency resource.

21. A wireless user device comprising:
at least one antenna to receive at least one wireless signal from a base station;
at least one processor; and
memory storing instructions that, when executed by the at least one processor, cause the wireless user device to:

receive a synchronization signal (SS) block to detect system information;

receive first system information comprising a first SS block position parameter associated with a first frequency resource, wherein the first SS block position parameter comprises:
- a first bitmap indicating a plurality of groups in which at least one SS block is transmitted, wherein the first frequency resource satisfies a threshold frequency, and wherein each group of the plurality of groups comprises first SS blocks; and
- a second bitmap indicating first positions of the first SS blocks, wherein each first position of the first positions corresponds to a respective SS block of the first SS blocks in each group of the plurality of groups, and
- wherein a size of the first bitmap corresponds to 8 bits and a size of the second bitmap corresponds to 8 bits;

detect, based on the first positions, at least one of the first SS blocks;

receive second system information comprising a second SS block position parameter associated with a second frequency resource, wherein the second SS block position parameter comprises:
- a third bitmap indicating second positions of second SS blocks, wherein a size of the third bitmap corresponds to 8 bits, wherein the second frequency resource does not satisfy the threshold frequency, and wherein each second position of the second positions corresponds to a respective SS block of the second SS blocks; and detect, based on the second positions, at least one of the second SS blocks.

22. The wireless user device of claim 21, wherein the instructions, when executed by the at least one processor, cause the wireless user device to:
receive the at least one of the first SS blocks via the first frequency resource; and
receive the at least one of the second SS blocks via the second frequency resource,
wherein a frequency of the first frequency resource is higher than the threshold frequency, and
wherein a frequency of the second frequency resource is lower than the threshold frequency.

23. The wireless user device of claim 21, wherein the instructions, when executed by the at least one processor, cause the wireless user device to:
receive, from the base station, information of one or more frequency resources that indicates one or more frequency bands to be used by the wireless user device,
wherein the first positions indicated by the second bitmap corresponds to time domain positions of the first SS blocks in each of the plurality of groups, and wherein the second positions indicated by the third bitmap corresponds to time domain positions of the second SS blocks.

24. The wireless user device of claim 21, wherein the second bitmap indicates transmission of up to eight SS blocks within a single group of the plurality of groups,
wherein the first bitmap indicates presence of up to eight groups, and
wherein the third bitmap indicates transmission of up to eight SS blocks.

25. The wireless user device of claim 21,
wherein the first system information is Remaining Minimum System Information (RMSI).

26. The wireless user device of claim 21, wherein the first bitmap indicates at least one second group in which SS blocks are absent, and
wherein the first bitmap indicates that at least one SS block is transmitted, in the plurality of groups, according to the second bitmap.

27. The wireless user device of claim 21, wherein the instructions, when executed by the at least one processor, cause the wireless user device to:
monitor at least one resource for at least one of the first SS blocks, wherein the at least one resource is associated with:
the first positions; and
the first frequency resource.

28. The wireless user device of claim 21, wherein the instructions, when executed by the at least one processor, cause the wireless user device to:
determine, based on a predefined bit value for the first bitmap, a position of the plurality of groups; and
determine, based on a predefined bit value for the second bitmap, a position of the first SS blocks in each of the plurality of groups.

29. The wireless user device of claim 21, wherein the instructions, when executed by the at least one processor, cause the wireless user device to:
receive the SS block to detect system information by receiving, based on a blind detection scheme, the SS block;
detect, from the SS block, an SS and a physical broadcast channel; and
after detecting the SS and the physical broadcast channel, receive the first system information.

30. The wireless user device of claim 21, wherein a first bit value of the first bitmap indicates the plurality of groups for which the second bitmap is applied, and
wherein a second bit value of the first bitmap indicates a plurality of second groups for which the second bitmap is not applied.

* * * * *